United States Patent
Ishida

(10) Patent No.: US 8,210,777 B2
(45) Date of Patent: Jul. 3, 2012

(54) CUTTING INSERT, MILLING TOOL AND CUTTING METHOD

(75) Inventor: Takuya Ishida, Higashiomi (JP)

(73) Assignee: Kyocera Corporation, Kyoto (JP)

( * ) Notice: Subject to any disclaimer, the term of this patent is extended or adjusted under 35 U.S.C. 154(b) by 745 days.

(21) Appl. No.: 12/091,906

(22) PCT Filed: Oct. 24, 2006

(86) PCT No.: PCT/JP2006/321168
§ 371 (c)(1),
(2), (4) Date: Feb. 6, 2009

(87) PCT Pub. No.: WO2007/049617
PCT Pub. Date: May 3, 2007

(65) Prior Publication Data
US 2009/0188356 A1 Jul. 30, 2009

(30) Foreign Application Priority Data

Oct. 28, 2005 (JP) ................................ P2005-314110
May 29, 2006 (JP) ................................ P2006-148580
May 29, 2006 (JP) ................................ P2006-148581

(51) Int. Cl.
*B23C 5/20* (2006.01)
*B26D 1/12* (2006.01)

(52) U.S. Cl. ............................................. 407/113; 407/66
(58) Field of Classification Search .................. 407/113, 407/114, 115, 116, 66, 67, 42
See application file for complete search history.

(56) References Cited

U.S. PATENT DOCUMENTS

| 4,115,024 A | * | 9/1978 | Sussmuth | 407/114 |
| 4,447,175 A | * | 5/1984 | Warren | 407/114 |
| 4,572,713 A | * | 2/1986 | Schmidt | 407/114 |
| 4,681,486 A | * | 7/1987 | Hale | 407/114 |
| 4,867,616 A | | 9/1989 | Jakubowicz | |
| 5,221,164 A | * | 6/1993 | Allaire | 407/113 |
| 5,525,016 A | * | 6/1996 | Paya et al. | 407/116 |
| 5,549,424 A | * | 8/1996 | Bernadic et al. | 407/100 |
| 5,725,334 A | | 3/1998 | Paya | |
| 5,779,401 A | * | 7/1998 | Stallwitz et al. | 407/114 |

(Continued)

FOREIGN PATENT DOCUMENTS

JP 07-299636 11/1995

(Continued)

OTHER PUBLICATIONS

Russian language office action and its English language translation for corresponding Russian application 2008121264/02 lists the references above.

(Continued)

*Primary Examiner* — Will Fridie, Jr.
(74) *Attorney, Agent, or Firm* — DLA Piper LLP (US)

(57) ABSTRACT

An object of the invention is to provide a cutting insert suitably usable even in a cutting. A cutting insert of the invention is formed in a substantially plate shape, wherein a groove part (6) is formed in a flank face (4), a main cutting edge (5) is composed of a plurality of main cutting edge divisions (5a) divided by the groove part (6), and a concave part (7) depressed in a rake face (2) is formed in a vicinity corresponding to each of the main cutting edge divisions (5) in the rake face (2).

32 Claims, 18 Drawing Sheets

U.S. PATENT DOCUMENTS

| | | | | |
|---|---|---|---|---|
| 5,791,832 A | * | 8/1998 | Yamayose | 407/113 |
| 5,791,833 A | * | 8/1998 | Niebauer | 407/114 |
| 5,975,812 A | | 11/1999 | Friedman | |
| 7,896,586 B2 | * | 3/2011 | Morgulis | 407/114 |
| 2010/0092253 A1 | * | 4/2010 | Ishida | 407/42 |
| 2010/0316452 A1 | * | 12/2010 | Ishida | 407/33 |

FOREIGN PATENT DOCUMENTS

| | | |
|---|---|---|
| JP | 08-257822 | 10/1996 |
| JP | 10-118810 | 5/1998 |
| JP | 11-347826 | 12/1999 |
| JP | 2003-025135 | 1/2003 |
| WO | 9840181 A1 | 9/1998 |

OTHER PUBLICATIONS

Extended European search report dated Nov. 30, 2011 issued in corresponding European application 06822148.0 cites the U.S. patents above.

Japanese language office action dated Feb. 1, 2011 and its English language translation for corresponding Japanese application 2007542595.

* cited by examiner

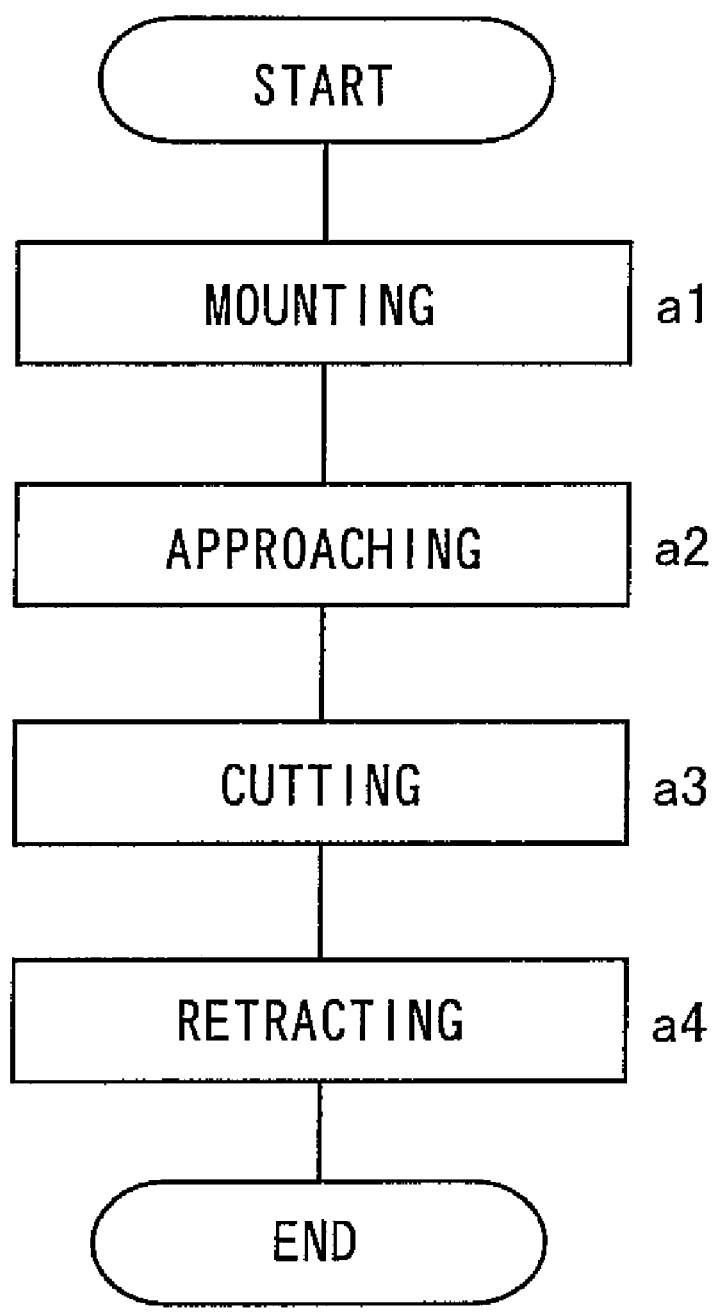

CUTTING INSERT, MILLING TOOL AND CUTTING METHOD

CROSS-REFERENCE TO THE RELATED APPLICATIONS

This application is a national stage of international application No. PCT/JP2006/321168 filed on Oct. 24, 2006, which also claims benefit of priority under 35 U.S.C. §119 to Japanese Patent Application No. 2005-314110 filed on Oct. 28, 2005, Japanese Patent Application No. 2006-148580 filed on May 29, 2006 and Japanese Patent Application No. 2006-148581 filed on May 29, 2006, the entire contents of all of which are incorporated herein by reference.

TECHNICAL FIELD

The present invention relates to a cutting insert used for a milling tool such as a face mill and an endmill, a milling tool to which the same is mounted and a cutting method using the same.

BACKGROUND ART

Bending stress operates on a holder when a milling tool such as a face mill and an endmill, particularly, a milling tool used with a large number of long cutting edges is used in a cutting. The holder has had specific stiffness for the purpose of preventing such bending stress from causing great flexure. In an actual cutting, however, bending stress operating on the holder changes in size in accordance with a cutting condition. Accordingly, lack of stiffness of the holder causes great flexure. This results in a rise of chatter vibration in the cutting, in some cases. Particularly in a heavy cutting in which a depth of cut is large, great increase in cutting resistance easily causes chatter vibration. In view of the above, widely used as means for reducing the cutting resistance in the cutting or the like has been a combination of plural cutting inserts having a flank face including a main cutting edge, the flank face being divided by a groove part.

As such a cutting insert, known has been a cutting insert in which a rake face continued from a main cutting edge includes a positive rake angle and a groove part is used for dividing a flank face including the main cutting edge (Japanese Unexamined Patent Publication JP-A 7-299636 (1995), for example). In the cutting insert, a chip formed by the main cutting edge is divided into pieces having a small thickness by the groove part, so that the cutting resistance is reduced while a biting property for a workpiece becomes excellent. This allows an effect of suppressing the chatter vibration in the cutting to be achieved.

In a cutting or the like in which a depth of cut is particularly large, however, even a cutting insert having the above-described structure is not always sufficient for suppressing the chatter vibration since the cutting resistance increases significantly.

It can be considered as one of measures for further suppressing the chatter vibration in the cutting or the like that the number of groove parts for dividing the flank face including the main cutting edge is made large to reduce the cutting resistance. In this case, however, there is a problem that the strength of a divided cutting edge part is greatly reduced, and thereby, a fracture of the cutting insert is easily caused.

DISCLOSURE OF INVENTION

The invention is made to solve such a problem of the conventional art, and an object of the invention is to provide a cutting insert used for a milling tool, particularly, a milling tool used with a large number of long cutting edges that is a highly reliable and stable cutting insert capable of suppressing chatter vibration in a cutting or the like without reducing the strength of a cutting edge part.

In order to solve the problem, the invention is a cutting insert comprising:
a main body part having an upper surface provided with a rake face and a side surface provided with a flank face;
a main cutting edge formed in an intersecting ridge line part of the rake face and the flank face; and
a groove part formed in the flank face and having one end reaching the rake face,
wherein the main cutting edge is composed of a plurality of main cutting edge divisions divided by the groove part, and
a concave part depressed in the rake face is formed in a vicinity corresponding to each of the main cutting edge divisions in the rake face.

Further, the invention is characterized in that the at least one projecting part includes a facing surface facing the corresponding main cutting edge division, and
the facing surface has a rising angle to the rake face, the rising angle gradually increasing as the facing surface goes away from the corresponding main cutting edge division.

Moreover, the invention is a cutting insert comprising:
a main body part having an upper surface provided with a rake face and a side surface provided with a flank face;
a main cutting edge formed in an intersecting ridge line part of the rake face and the flank face; and
a groove part formed in the flank face and having one end reaching the rake face,
wherein the main cutting edge is composed of a plurality of main cutting edge divisions divided by the groove part,
a concave part depressed in the rake face and at least one projecting part are formed in a vicinity corresponding to each of the main cutting edge divisions in the rake face,
the projecting part includes a first projecting part, and
a second projecting part formed on a side opposite to the corresponding main cutting edge division with respect to the first projecting part, the second projecting part being higher than the first projecting part.

Furthermore, the invention is a cutting method of cutting a workpiece by the milling tool, comprising:
a cutting step for rotating at least one of the milling tool and the workpiece and cutting a surface of the workpiece by contact of the main cutting edge division with the surface of the workpiece; and
a retracting step for retracting the main cutting edge division from the workpiece.

Furthermore, the invention is a cutting method of cutting a workpiece by the cutting insert, comprising:
a mounting step for mounting the cutting insert to a holder for a milling tool to form the milling tool, the holder being capable of mounting and demounting a plurality of cutting inserts at outer circumferential positions thereof;
a cutting step for rotating at least one of the milling tool and the workpiece and cutting a surface of the workpiece by contact of the main cutting edge division with the surface of the workpiece; and
a retracting step for retracting the main cutting edge division from the workpiece.

BRIEF DESCRIPTION OF DRAWINGS

Other and further objects, features, and advantages of the invention will be more explicit from the following detailed description taken with reference to the drawings.

FIG. 21 is a flowchart showing a cutting method using the milling tool 9.

BEST MODE FOR CARRYING OUT THE INVENTION

Figure 1:
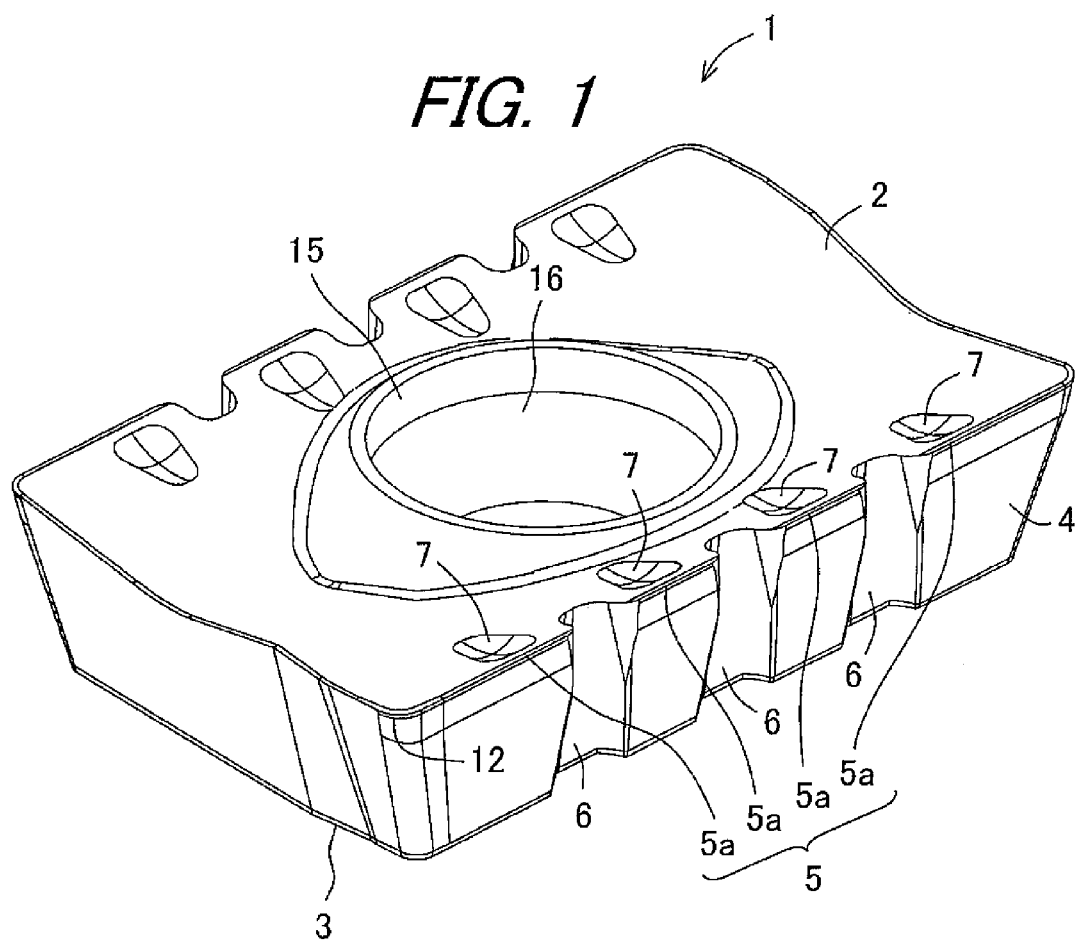
FIG. 1 is a perspective view showing a whole configuration of a cutting insert 1 in accordance with a first embodiment of the invention.

Now referring to the drawings, preferred embodiments of the invention are described below.

In each embodiment, structures corresponding to structures described in a preceding embodiment are marked with the same reference numerals and repeated description will be omitted in some cases. In the case of describing only one part of a structure, the other part of the structure is assumed to be the same as a part in a precedently described embodiment. Not only parts concretely described in respective embodiments but also embodiments can be partially combined so long as the combination has no specific problem. A condition for starting each flowchart is not necessarily limited only to a described condition of a start.

Figure 2:
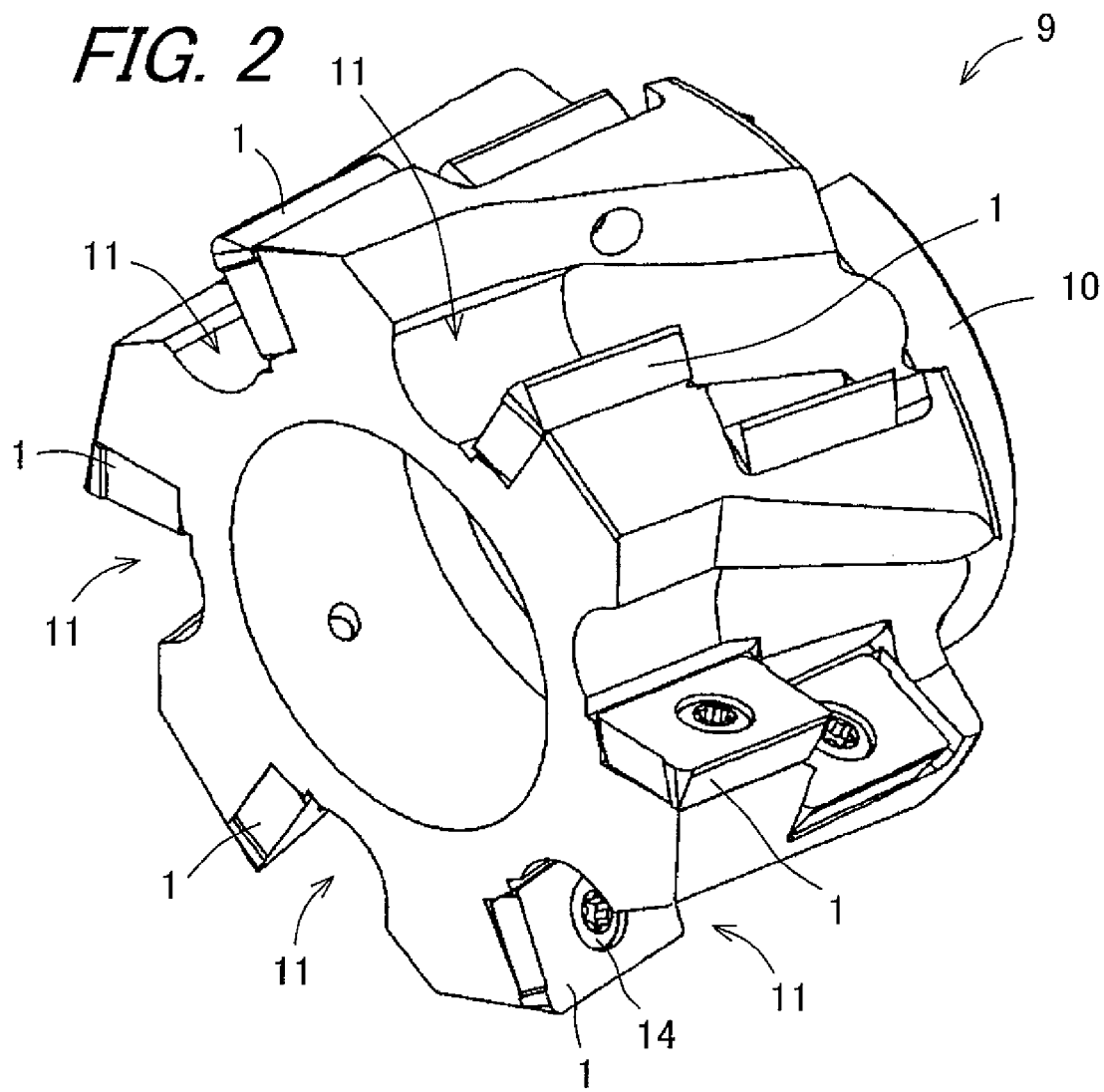
FIG. 2 is a perspective view of a milling tool 9.
Figure 3:
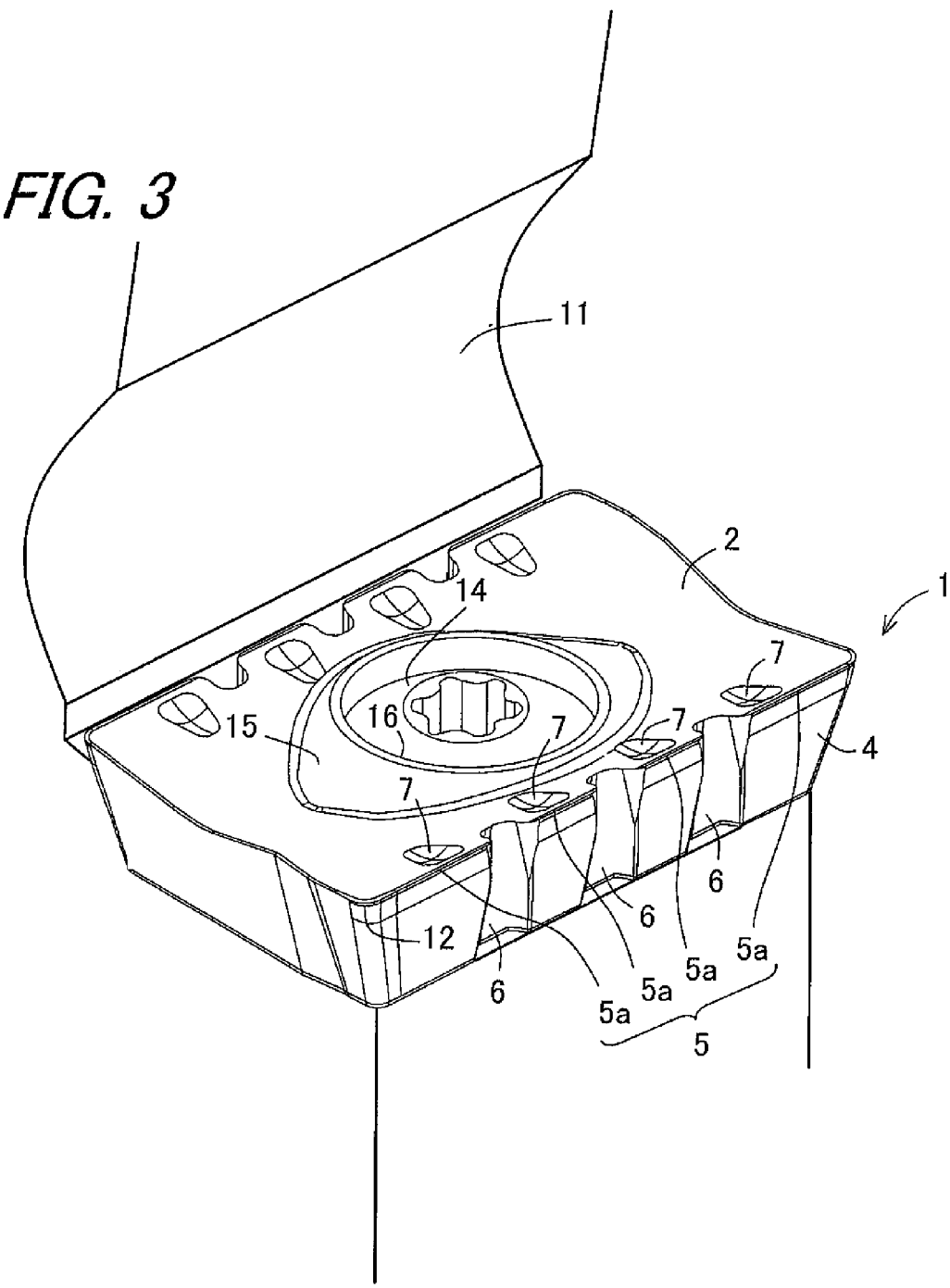
FIG. 3 is an enlarged perspective view showing the vicinity of the cutting insert 1 of the milling tool 9.

FIG. 1 is a perspective view showing a whole configuration of a cutting insert 1 in accordance with a first embodiment of the invention. FIG. 2 is a perspective view of a milling tool 9. FIG. 3 is an enlarged perspective view showing the vicinity of the cutting insert 1 of the milling tool 9. The milling tool 9 is formed of the cutting insert 1 mounted to a holder for a milling tool (referred to as a "holder" in some cases, hereinafter) 10.

Figure 15:
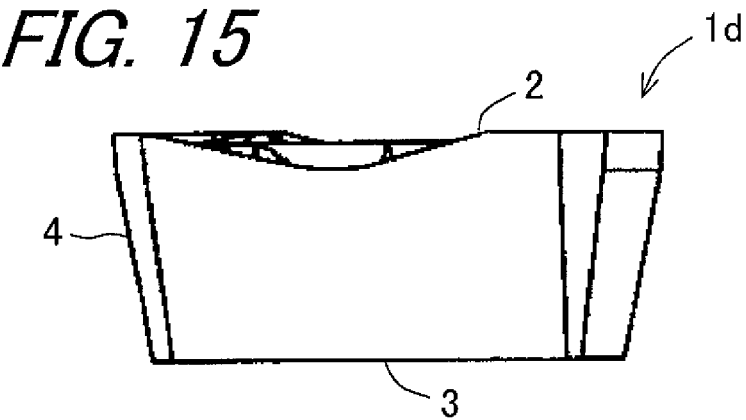
FIG. 15 is a side view of a short side of the cutting insert 1d in accordance with the fifth embodiment.

As shown in FIG. 1, the cutting insert (referred to as an "insert" in some cases, hereinafter) 1 in accordance with the first embodiment of the invention is formed in a substantially polygonal plate shape, concretely, a substantially parallelogram plate shape. The cutting insert has a rake face 2 in its upper surface, a bottom surface 3 in its lower surface and a flank face 4 in its side surface. The rake face 2 is a basic surface for forming the upper surface of the cutting insert 1. A main cutting edge 5 is formed in an intersecting ridge line part of the rake face 2 and the flank face 4. The rake face 2 curves into the shape of a concave so as to form a concave toward the bottom surface 3, as shown in FIG. 15 in the first embodiment.

In the flank face 4, formed are plural (three in the first embodiment) groove parts 6, each of which has one end reaching the rake face 2 and the other end reaching the bottom surface 3. The main cutting edge 5 is formed of plural (four in the first embodiment) main cutting edge divisions 5a divided by the groove parts 6. At a corner of the insert 1, a corner cutting edge 12 is formed in an intersecting ridge line part of the flank face 4 and the rake face 2. The corner cutting edge 12 is connected to a main cutting edge division 5a of the main cutting edge 5, the main cutting edge division 5a located most closely to the corner cutting edge 12. Concave parts 7, which are depressed in the rake face 2, are formed in positions corresponding to the main cutting edge divisions 5a in the vicinity of the main cutting edge divisions 5a in the rake face 2 so as to correspond to the respective main cutting edge divisions 5a. Each of the concave parts 7 is formed so as to be further depressed in the rake face 2 curving into the shape of a concave toward the bottom surface 3. In other words, the concave part 7 is formed in the vicinity of an area between the groove parts 6 adjacent to each other. Moreover, the concave part 7 is provided so as to extend in a direction substantially vertical to each of the main cutting edge divisions 5a. In other words, the concave part 7 is formed so as to extend in a direction crossing at substantially right angles with the flank face 4. Such a concave part 7 is provided so that the strength of the cutting edge is maintained as much as possible. At the substantial center of the rake face 2, formed is a screw hole 16 passing through to the lower surface. An annular protrusion part 15, which protrudes from the rake face 2, is formed in the peripheral part of the screw hole 16.

The milling tool 9 basically comprises the insert 1, and a holder 10 which forms a substantial cylinder shape and to which the plural inserts 1 are detachable in outer circumferential positions, as shown in FIG. 2. In plural places of the outer circumference of the holder 10, formed are mounting parts to which the inserts 1 are mounted and chip pockets 11 adjacent to the mounting parts. In detail, the insert 1 is put in the mounting part so that its rake face 2 faces a direction of rotation and its main cutting edge 5 is located on the outer circumferential side. The insert 1 is fixed to the holder 10 by clamp means 14 such as a screw member. The main cutting edge 5 rotates together with the holder 10 to carry out cutting.

As described above, in the insert 1 and the milling tool 9 in accordance with the invention, the groove parts 6 dividing the flank face 4 including the main cutting edge 5 are arranged so that the strength of the cutting edge is maintained while the concave parts 7 are provided. In the case that such an insert 1 is mounted to the holder 10 to be used for the cutting as the milling tool 9, the plural main cutting edge divisions 5a divided by the groove parts 6 cut a surface of a workpiece. Contact between chips 13 formed in cutting and the rake face 2 is reduced in ratio when the chips 13 pass on the rake face 2 since the rake face 2 is provided with the concave part 7. The reduction of the contact ratio causes frictional resistance to be reduced, so that the cutting resistance is reduced.

That is to say, providing the concave part 7 causes the contact ratio of the chips 13 in passing on the rake face 2 to be reduced, so that the cutting resistance is reduced more than the conventional case that the full width of chips 13 contact with the rake face 2. Accordingly, arranging that the structure of the main cutting edge 5 be maintained while the cutting resistance be reduced allows chatter vibration in the cutting or the like to be suppressed without reducing the strength of the cutting edge part. Further, suppressing the chatter vibration of the milling tool 9 allows a processed surface of a workpiece to be finished excellently and a shock (minute vibration) given to the cutting edge to be reduced. This allows the life of the tool to be prolonged, so that a cost can be reduced in total.

Moreover, the concave part 7 is formed in the area between the adjacent groove parts 6 in the first embodiment. Accordingly, it is possible to increase the probability that the chips 13 formed by the main cutting edge division 5a in the area between the adjacent groove parts 6 pass above the concave part 7. This allows the concave part 7 to be formed only in a necessary position, so that deterioration in strength of the cutting edge due to the concave part 7 can be reduced as much as possible, and thereby, the chatter vibration can be suppressed.

Furthermore, the concave part 7 is formed so as to extend in a direction substantially vertical to each of the main cutting edge divisions 5a, namely, a direction in which the chips formed by the respective main cutting edge divisions 5a advance. This allows the contact ratio between the chips 13 passing on the rake face 2 and the rake face 2 to be effectively reduced. As a result, the cutting resistance can be effectively reduced.

In addition, forming the concave part 7 causes the surface area of the rake face 2 in the vicinity of the cutting edge to be increased, and thereby, more cutting heat to radiate. Accordingly, a rise in temperature of the cutting edge part is mitigated. This results in an effect of suppression of advance in wear of the insert. Moreover, forming plural concave parts 7 for the respective main cutting edge divisions 5a is further preferable since the effect of the radiation of heat is enhanced more.

Further, a head part of the clamp means 14 is behind the annular protrusion part 15 when the insert 1 is mounted to the holder 10, as shown in FIG. 2. That is to say, the head part of the clamp means 14 is lower than the annular protrusion part 15. This allows wear of the head part of the clamp means 14 due to a collision with the chips 13 to be prevented.

Figure 4:
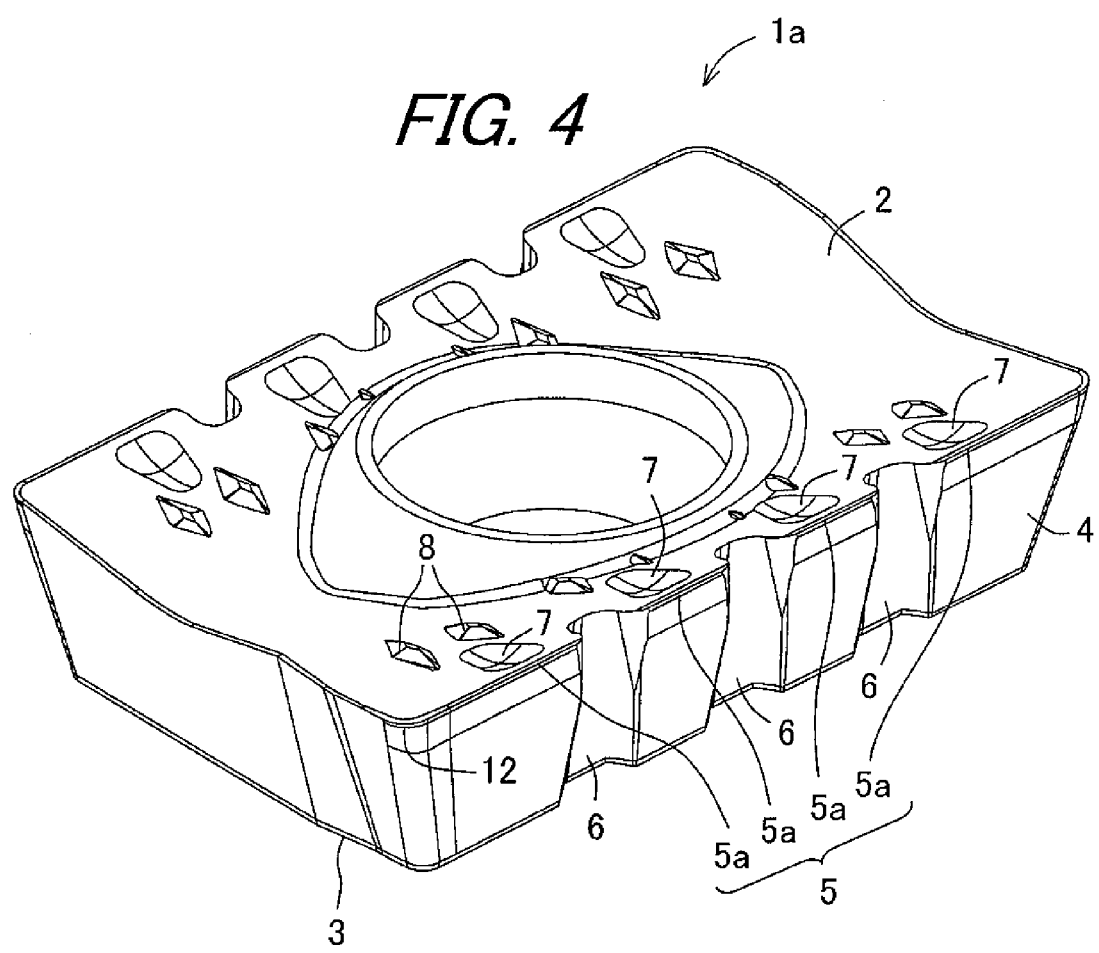
FIG. 4 is a perspective view of a cutting insert 1a in accordance with a second embodiment.

Now, described will be a second embodiment of the invention. FIG. 4 is a perspective view of a cutting insert 1a in accordance with the second embodiment. The insert 1a in accordance with the second embodiment is provided with concave parts 7 in the vicinity of the main cutting edge division 5a in the rake face 2 and at least one projecting part 8 in the rake face 2 so as to correspond to the main cutting edge division 5a. Concretely, the concave part 7 is provided so as to extend between the projecting part 8 and the main cutting edge division 5a corresponding to the concave part 7. The at least one projecting part 8 is provided for every corresponding dividing main cutting edge 5a. Two projecting parts 8 are provided in the second embodiment. The projecting part 8 has a facing surface 17 facing the corresponding main cutting edge division 5a. The facing surface 17 is formed at a position where the chips 13 formed by cutting a workpiece by the corresponding main cutting edge division 5a collide. The facing surface 17 preferably has a part substantially parallel to each of the main cutting edge divisions 5a since it is easy to receive the chips 13. The facing surface 17 is formed so as to gradually rise from the rake face 2 as it goes away from the faced main cutting edge division 5a. In other words, the facing surface 17 is formed into the shape of a taper inclining with respect to the rake face 2. The concave part 7 contributes to reduction in cutting resistance, as described above, while collision of the chips formed by the main cutting edge division 5a with the facing surface 17 of the projecting part 8 can cause the chips to certainly curl. This allows excellent chip removal to be achieved. Accordingly, the chips 13 collide with the facing surface 17 and this causes the chips 13 to curl into small size.

Figure 5:
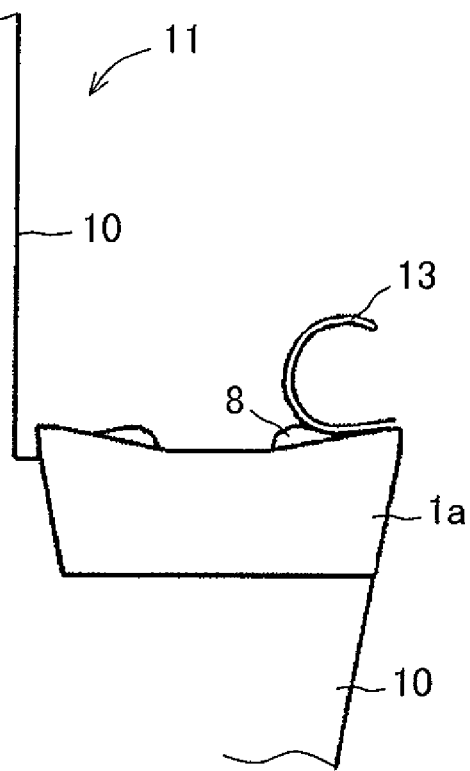
FIG. 5 is a front view of the milling toot 9 to which the insert 1a in accordance with the second embodiment is mounted, which view shows a cutting state.
Figure 6:
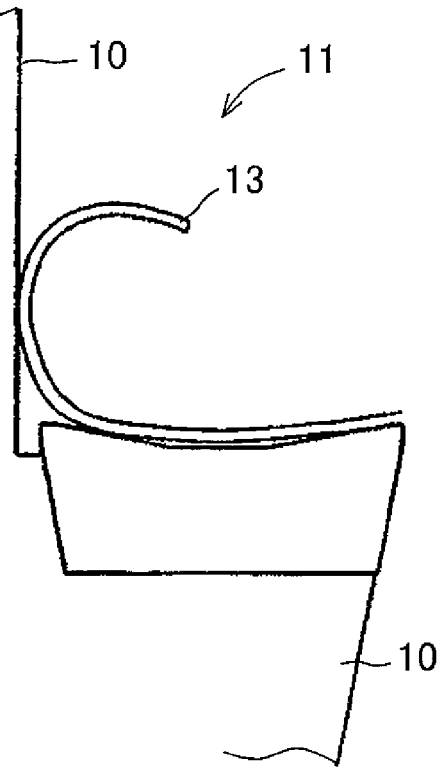
FIG. 6 is a front view of a milling tool to which a conventional insert is mounted, which view shows a cutting state.

FIG. 5 is a front view of the milling tool 9 to which the insert 1a in accordance with the second embodiment is mounted, which view shows a cutting state. FIG. 6 is a front view of a milling tool to which a conventional insert is mounted, which view shows a cutting state. In the case that the insert in accordance with the conventional art in which no projecting part 8 is formed in the rake face 2 is mounted to the holder as shown in FIG. 6 to be used as a milling tool for cutting general carbon steel, stainless steel or the like, the chips 13 formed by the main cutting edge go toward a center side of the holder on the rake face since the chips are thick and have high stiffness. This causes the chips 13 to collide with a holder wall surface 10a of the chip pocket 11 to be removed to the outside with the holder wall surface 10a functioning as a guide. This causes a problem that friction occurs between the holder wall surface 10a and the chips 13. That is to say, there is a problem that repeatedly carrying out the cutting causes the holder wall surface 10a of the chip pocket 11 to gradually wear and to be chipped away at last, so that the holder wall surface 10a having a part chipped away is stuffed with the chips 13 or the stiffness of the holder 10 decreases, and thereby, precision in process deteriorates. Particularly, the thicker the chips 13 formed in the cutting are, the more significant the wear advances. This causes a large problem that the damaged holder 10 should be changed at an early stage.

On the other hand, arranging that the projecting parts 8 be provided in the rake face 2 of the insert 1 so as to correspond to each of the main cutting edge divisions 5a, as in the invention, allows the chips 13 formed by the main cutting edge divisions 5a to be certainly curled by the projecting parts 8. As a result, the chips 13 can be removed to the outside with no collision with the holder wall surface 10a. Accordingly, there is no problem that the holder wall surface 10a of the holder 10 is damaged, so that an advantage in cost such as reduction in expense of tools can be achieved since the holder 10 can be used for a long period of time. Moreover, a small diameter of the curl of the chips 13 causes the respective chips 13 to be reduced in size, so that the chips 13 can be smoothly removed from the chip pocket 11 to the outside. This allows a problem such as a fracture of the main cutting edge 5 due to the chips 13 stuffed in the cutting edge to be suppressed and the life of the insert 1a to be prolonged. In cutting a workpiece such as carbon steel and stainless steel described above, effective is the insert 1a having the projecting part 8 since the chips easily get longer. In cutting a workpiece such as cast iron, however, even an insert having no projecting part 8 can be also sufficient since the chips are easily cut into small pieces.

Moreover, the concave part 7 is provided so as to extend between the projecting part 8 and the main cutting edge division 5a. This allows both of an effect of reducing the cutting resistance, the effect being achieved when the chips pass above the concave part 7, and a chip removal effect achieved by collision of the chips with the projecting part 8 after the chips passed above the concave part 7 to be managed.

Furthermore, the annular protrusion part 15 is formed in the peripheral part of the screw hole 16 at the center part of the rake face 2. This allows the chips to certainly curl even in the case that a curling function of the projecting part 8 for the chips is insufficient.

Figure 7:
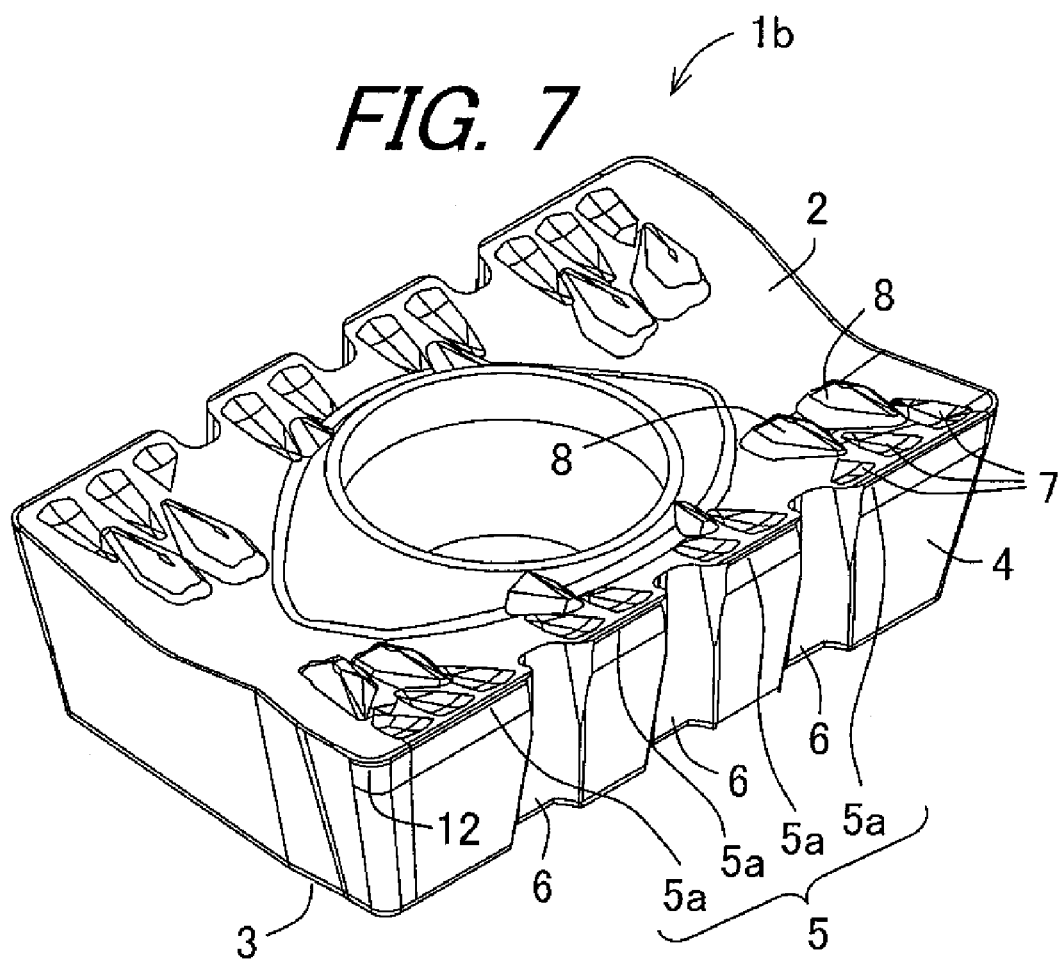
FIG. 7 is a perspective view showing a whole configuration of a cutting insert 1b in accordance with a third embodiment.

Now, described will be a third embodiment of the invention. FIG. 7 is a perspective view showing a whole configuration of a cutting insert 1*b* in accordance with the third embodiment. The insert 1*b* in accordance with the third embodiment is characterized in that plural (two or three in the third embodiment) concave parts 7 are provided for the corresponding respective main cutting edge divisions 5*a*. It is also characterized in that plural (one or two in the third embodiment) projection parts 8 are provided for the corresponding respective main cutting edge divisions 5*a*, similarly to the above. The projecting part 8 adjacent to the protrusion part 15 and the protrusion part 15 are continuously and integrally formed in the insert 1*b* in accordance with the third embodiment. The protrusion part 15 is formed so as to be higher in height from the rake face 2 than the projecting part 8. In the above-described context, "the projecting part 8 and the protrusion part 15 are continuously formed" means that a protrusion part-15-side end of the projecting part 8 is connected to a projecting-part-8-side end of the protrusion part 15 to arrange the connected part so as to be higher than the projecting part 8. Accordingly, in the whole view of the projecting part 8 and the protrusion part 15, the connected part is arranged not to be depressed in a surface of the projecting part 8 but to be higher than the surface of the projecting part 8 like the shape of a taper.

As described above, the concave part 7 is provided in plural numbers so as to extend in the direction substantially vertical to the respective main cutting edge divisions 5*a*. Accordingly, the ratio of contact of the chips passing on the rake face 2 with the rake face 2 can be reduced to effectively reduce the cutting resistance. In addition to the above, an original part of the rake face 2 left in the shape of a rung between the plural concave parts 7 formed in an area of the rake face 2 in the vicinity of the respective main cutting edge divisions 5*a* allows the strength of the cutting insert 1*b* to be maintained.

Further, the concave part 7 is provided in plural numbers for the respective main cutting edge divisions 5*a* in the third embodiment. This allows the ratio of contact of the chips 13 passing on the rake face 2 with the rake face 2 to be reduced to effectively reduce the cutting resistance. Additionally, the rake face 2 is located between the adjacent concave parts 7 formed in the area of the rake face 2 in the vicinity of the respective main cutting edge divisions 5*a*. This allows the strength of the cutting insert 1*b* to be maintained.

Moreover, the annular protrusion part 15 is formed in the peripheral part of the screw hole 16 at the center part of the rake face 2 while the projecting part 8 is formed continuously to the protrusion part 15. Accordingly, the projecting part 8 is reinforced more than the case that the projecting part 8 is provided independently. Further, the protrusion part 15 is formed to be higher than the projecting part 8, so that the protrusion part 15 plays a role of a chip guide for preventing the chips 13 from colliding the holder wall surface 10*a*. Moreover, forming the projecting part 8 continuously to the protrusion part 15 allows no problem that the chips 13 are stuffed between the protrusion part 15 and the projecting part 8 to occur.

Figure 8:
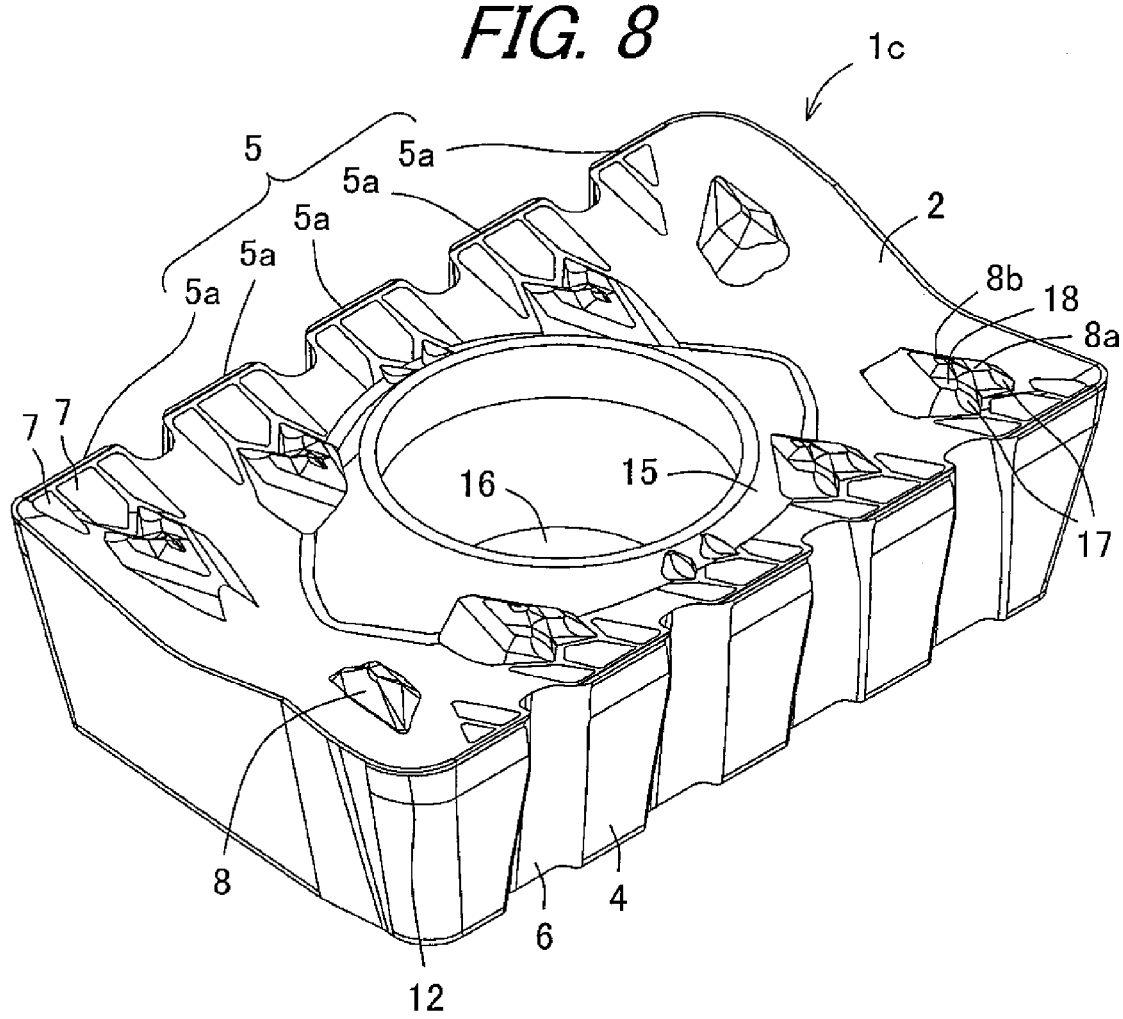
FIG. 8 is a perspective view of a cutting insert 1c in accordance with a fourth embodiment.
Figure 9:
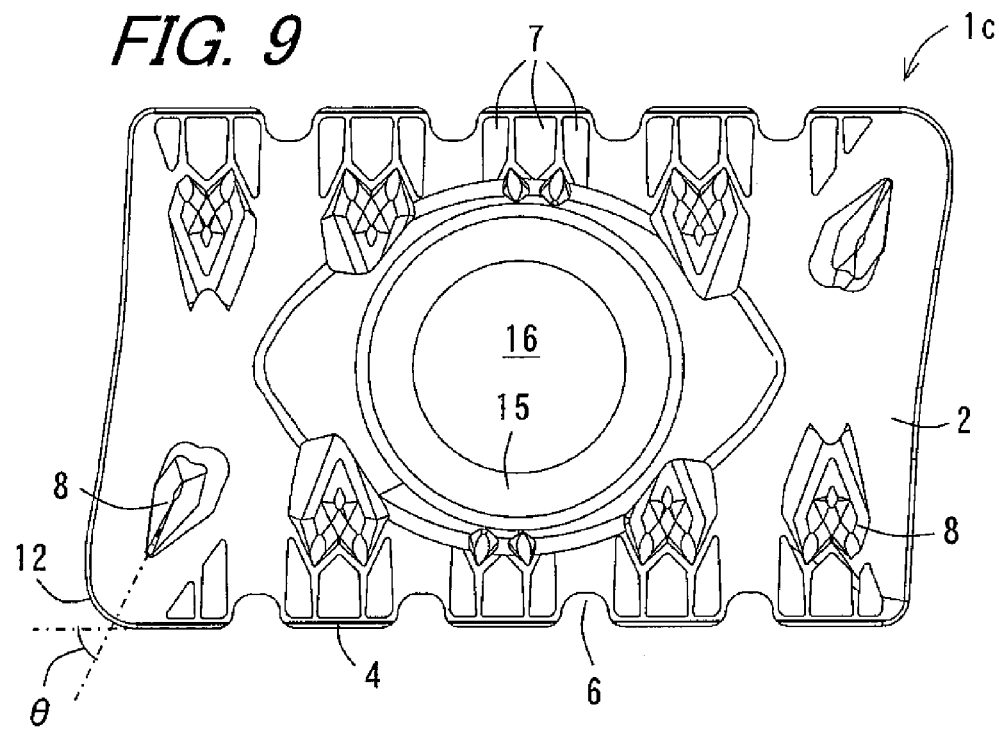
FIG. 9 is a plan view of the cutting insert 1c in accordance with the fourth embodiment.
Figure 10:
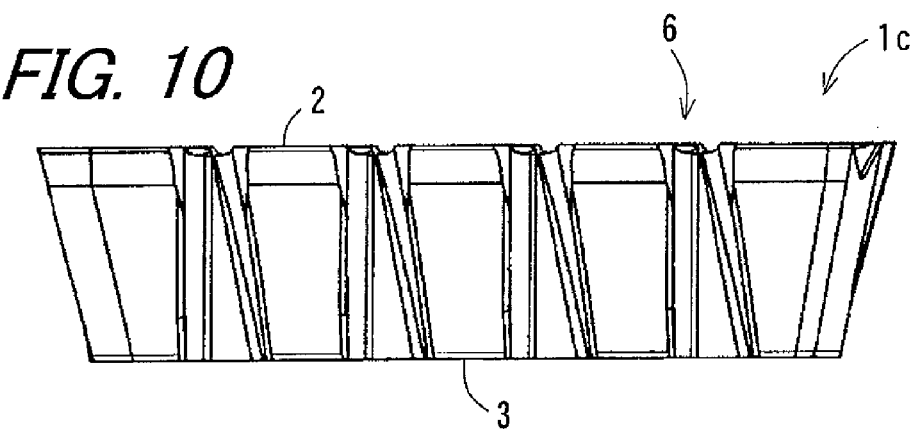
FIG. 10 is a side view of a long side of the cutting insert 1c in accordance with the fourth embodiment.

Now, described will be a fourth embodiment of the invention. FIG. 8 is a perspective view of a cutting insert 1*c* in accordance with the fourth embodiment. FIG. 9 is a plan view of the insert 1*c* in accordance with the fourth embodiment. FIG. 10 is a side view of a long side of the insert 1*c* in accordance with the fourth embodiment. The insert 1*c* in accordance with the fourth embodiment is characterized by the shape of the projecting part 8.

In the fourth embodiment, the projecting part 8 comprises at least one first projecting part 8*a*, which is located on a corresponding main cutting edge division side, and at least one second projecting part 8*b*, which is continued from the first projecting part 8*a* and formed on a side opposite to the main cutting edge division 5*a* corresponding to the first projecting part 8*a* and which is higher than the first projecting part 8*a*. Accordingly, the first projecting part 8*a* of each projecting part 8 is provided on a side closer to the corresponding main cutting edge division 5*a*. In the above-described context, "the second projecting part 8*b* is continued from the first projecting part 8*a*" means a second-projecting-part-8*b*-side end of the first projecting part 8*a* is connected to a first-projecting-part-8*a*-side end of the second projecting part 8*b* to arrange the connected part so as to be higher than the first projecting part 8*a*. Accordingly, in the whole view of the projecting part 8, the connected part is arranged not to be depressed in a surface of the first projecting part 8*a* but to be higher than the surface of the first projecting part 5*a* like the shape of a taper. The facing surface 17 described above is formed in the first projecting part 8*a*. The second projecting part 8*b* has a chip guide surface 18 facing the corresponding main cutting edge division 5*a* on a main cutting edge 5 side of the second projecting part 8*b*.

The facing surface 17 comprises a curved concave surface or plural flat surfaces in which a rising angle from the rake face gradually increases as the curved concave surface or plural flat surfaces goes away from the corresponding main cutting edge division 5*a*. This causes the chips 13 to collide with plural places of the facing surface 17, so that the stress operating on the first projecting part 8*a* is dispersed. Accordingly, the stress operating on the projecting part 8 having the first projecting part 8*a* can be dispersed.

In concrete description, in accordance with the structure of the invention, the chips 13 first collide with a part having a small rising angle with respect to a bottom surface 10 of the facing surface 17, and then, collide with a part having a large rising angle of the facing surface 17.

The stress operating on the facing surface 17 by the chips 13 is largest in the first collision. Accordingly, the first projecting part 8*a* receives large stress in the case that only the part having a large rising angle with respect to the bottom surface 10 of the facing surface 17 is formed in the first projecting part 8*a*. This causes the projecting part 8 to receive large stress. That is to say, the insert receiving large stress from the chips 13 significantly deteriorates to shorten its life although the first projecting part 8*a* is for preventing wear due to collision of the chips 13 with the holder wall surface 10*a*. In the case, however, that only the part having a small rising angle with respect to the bottom surface 10 of the facing surface 17 is formed in the first projecting part 8*a* for the purpose of preventing wear of the insert 1*c*, the curling operation of the chips 13 becomes insufficient, so that the chips cannot be completely prevented from colliding with the holder wall surface 10*a*, as a result.

On the other hand, in accordance with the invention, the stress in first collision of the chips 13 with the first projecting part 8*a* can be reduced while collision in other places can contribute to suppression of collision of the chips 13 with the holder wall surface 10*a*.

Figure 11:
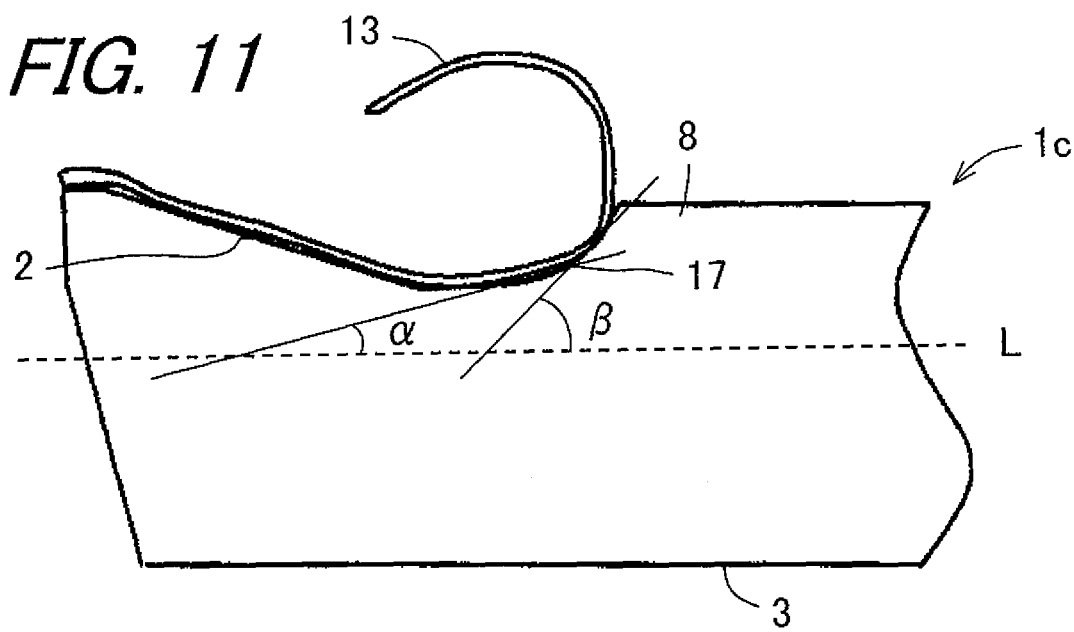
FIG. 11 is an enlarged view of the short side of the cutting insert 1c, which view is a simplified side view showing a state of forming the chips 13 in cutting.

FIG. 11 is an enlarged view of the short side of the insert 1*c*, which view is a simplified side view showing a state of forming the chips 13 in cutting. "A curved concave surface" or "plural flat surfaces" has a part where the rising angle gradually increases with respect to the bottom surface 3 as the part goes away from the corresponding main cutting edge division 5*a*, as shown in FIG. 11. In the case that the facing surface 17 is the curved concave surface, determined is a point in the facing surface 17 to assume an angle between a tangent of the point and the bottom surface 10 to be $\alpha$. Another point away from the main cutting edge division 5*a* more than the former point is determined to assume an angle between a tangent of the latter point and the bottom surface 10 to be $\beta$. The facing surface 17 includes a part where the angles $\alpha$ and $\beta$ increase as the part goes away from the corresponding main cutting edge division 5*a*. In the case that the facing surface 17 is formed of plural flat surfaces, an angle between one flat surface of the plural flat surfaces and the bottom surface 10 is assumed to be $\alpha$ while an angle between another flat surface away from the main cutting edge division 5*a* more than the former flat surface and the bottom surface 10 is assumed to be $\beta$. This is enough as long as it satisfies the above requirement. In FIG. 11, an auxiliary line L parallel to the bottom surface 10 is drawn to show $\alpha$ and $\beta$.

The "curved concave surface" in the above-described context is not specifically limited as long as it has a curved surface formed into the shape of a convex and may be only a curved surface or a combination of a flat surface and a curved surface so long as it satisfies the above requirement.

Further, in the case of comprising the "plural flat surfaces", it is preferable that the two or more flat surfaces different in angle are provided more in numbers since it is highly possible for the chips 13 to be in contact with the facing surface 17 for plural times.

The most preferable case is a case of comprising the curved concave surface as shown in FIG. 11. In this case, there is a high possibility of collision for plural times in the facing surface 17 while a state that the chips 13 give the stress to the holder wall surface 10*a*, namely, a state that the chips 13 collide at high speed can be effectively prevented.

Further, the main-cutting-edge-5-side end of the facing surface 17 is formed on the main cutting edge 5 side of the first projecting part 8*a*, and therefore, located at a position closest to the corresponding main cutting edge division 5*a* of the projecting part 8. This is preferable since it causes the probability of first collision of the chips 13 with a place other than the facing surface 17 to be reduced.

Moreover, the first projecting part 8*a* is narrowest at the end of the facing surface 17 and has a part increasing in width as the part goes away from the corresponding main cutting edge division 8*a*. As described above, the facing surface 17 is formed in a position with which the chips 13 collide. The stress of the chips 13 is so large that the holder wall surface 10*a* is worn. Accordingly, forming the first projecting part 8*a* so that the rear of the facing surface 17 is wider is preferable since this allows the projecting part 8 to be reinforced.

In other words, the main cutting edge 5 side of the first projecting part 8*a* is formed so that it is gradually reduced in width and height as it approaches each of the corresponding main cutting edge divisions 5*a*. This causes the projecting part 8 contacting with the chips 13 to be lowered in height as the projecting part 8 approaches the main cutting edge division 5*a*, that is to say, a ridge line part of the projecting part 8 to gradually increase in height as the ridge line part goes away from the main cutting edge division 8*a*. Accordingly, the projecting part 8 and the chips 13 come into smooth contact, so that a rapid increase in cutting resistance can be suppressed.

Furthermore, each projecting part 8 is arranged so that plural first projecting parts 8*a* are formed integrally with one second projecting part 8*b* in the fourth embodiment. In other words, the first projecting part 8*a* is formed in plural numbers for the facing main cutting edge division 5*a* while the plural first projecting parts 8*a* are formed continuously from the second projecting part 8*b* at a position away from the corresponding main cutting edge divisions 5*a* more than the facing surface 17. Such a structure allows the projecting parts 8 to reinforce each other, and thereby, the strength of the plural projecting parts 8 as a whole to be improved.

In addition, forming the second projecting part 8*b* continuously to the two or more first projecting parts 8*a* allows the stress of the chips 13, which operates on the respective first projecting parts 8*a*, to be dispersed.

Further, each of the second projecting parts 8*b* is formed on a side opposite to the corresponding main cutting edge division 5*a* of each projecting part 8 so as to be higher than the first projecting part 8*a*. This allows the chips 13 to be effectively prevented from colliding with the holder wall surface 10*a*. It is preferable to form the second projecting part 8*b* continuously to the first projecting part 8*a* having the facing surface 17, as in the fourth embodiment, since the strength of the projecting part 8 receiving great stress from the chips 13 is reinforced.

Moreover, no problem that the chips 13 are stuffed between the protrusion part 15 and the second projecting part 8*b* occurs since the protrusion part 15 is formed continuously to the second projecting part 8*b*.

The protrusion part 15 may be used for the second projecting part 8*b*. In this case, it is not necessary to provide second projecting part 8*b* separately. This is superior in productivity.

Furthermore, the corner cutting edge 12 is formed at a corner of the insert 1*c* connected to the main cutting edge division 5*a*, as described above. The projecting part 8 corresponding to the main cutting edge division 5*a* located on a corner cutting edge 12 side is formed so that the width and the height thereof are gradually reduced toward the corner cutting edge 12. This allows the chips 13 having a part of the cross section, the part being formed into the shape of an arc by the corner cutting edge 12, to be most efficiently curled in a fixed direction.

In addition, it is preferable that an angle $\theta$ between a ridge line on a corner cutting edge 12 side of the projecting part 8 corresponding to the corner cutting edge 12 and the main cutting edge division 5*a* is in a range of from 60° to 85°, as shown in FIG. 9, from a point of view that the chips 13 formed by the corner cutting edge 12 can be more certainly curled into a small size. The chips 13 are easily stuffed and the cutting resistance is likely to increase when $\theta$ is smaller than 60°. On the other hand, when $\theta$ is larger than 85°, the chips 13 are difficult to curl. This causes not only no improvement in wear of the holder wall surface 10*a* but also reduction in removing performance of the chips 13*a* due to a large size of the chips 13 and probability of disadvantages such as a fracture of the cutting edge due to the chips 13 stuffed in the cutting edge.

Moreover, the second projecting part 8*b* has a chip guide surface 18 facing the corresponding main cutting edge division 5*a* on the main cutting edge 5 side of the second projecting part 8*b*. The chip guide surface 18 is achieved in accordance with a structure similar to that of the facing surface 17 of the first projecting part 8*a*. The chip guide surface 18 gradually rises from the rake face 2 as it goes away from the facing main cutting edge division 5a. Such a cutting guide surface 18 suppresses advance of the chips 13 in a direction opposite to that of the facing main cutting edge division 8a. In the case of providing such a cutting guide surface 18, a direction of removing the chips 13 is fixed along the chip guide surface 18. This allows the chip removing performance to be further improved, so that a damage of the holder wall surface 10a due to the chips can be prevented.

Figure 12:
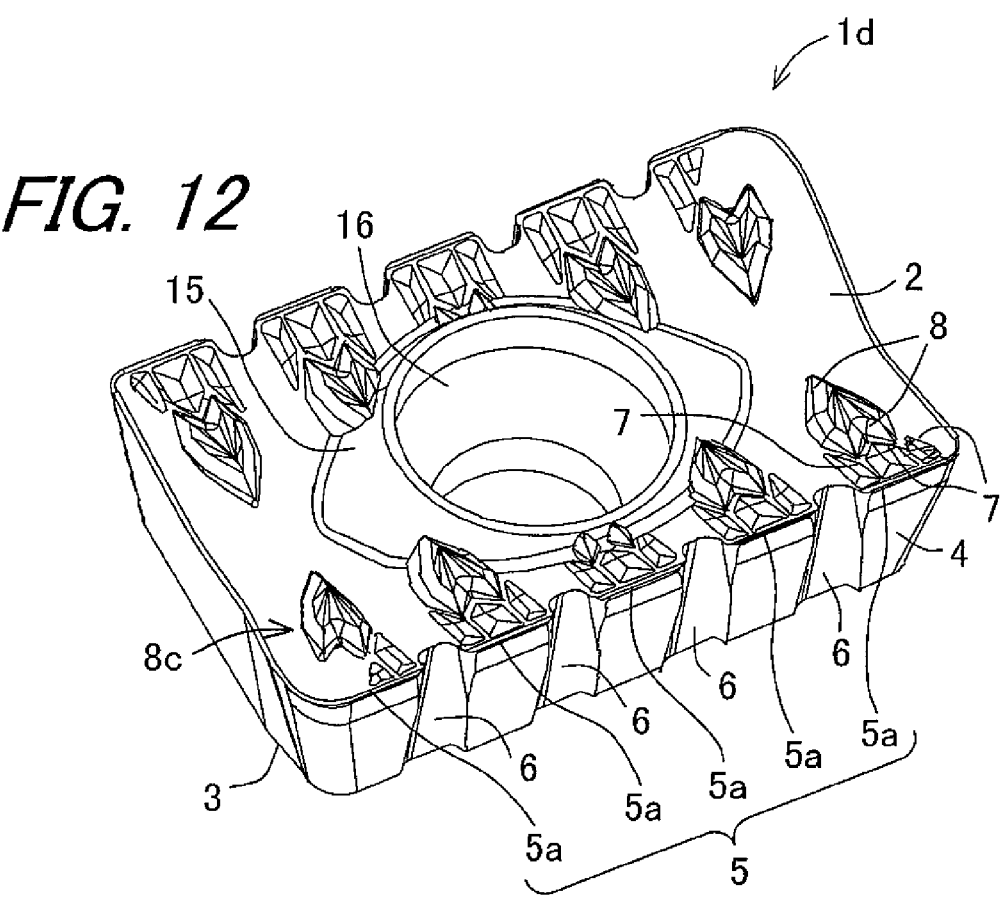
FIG. 12 is a perspective view of a cutting insert 1d in accordance with a fifth embodiment.
Figure 13:
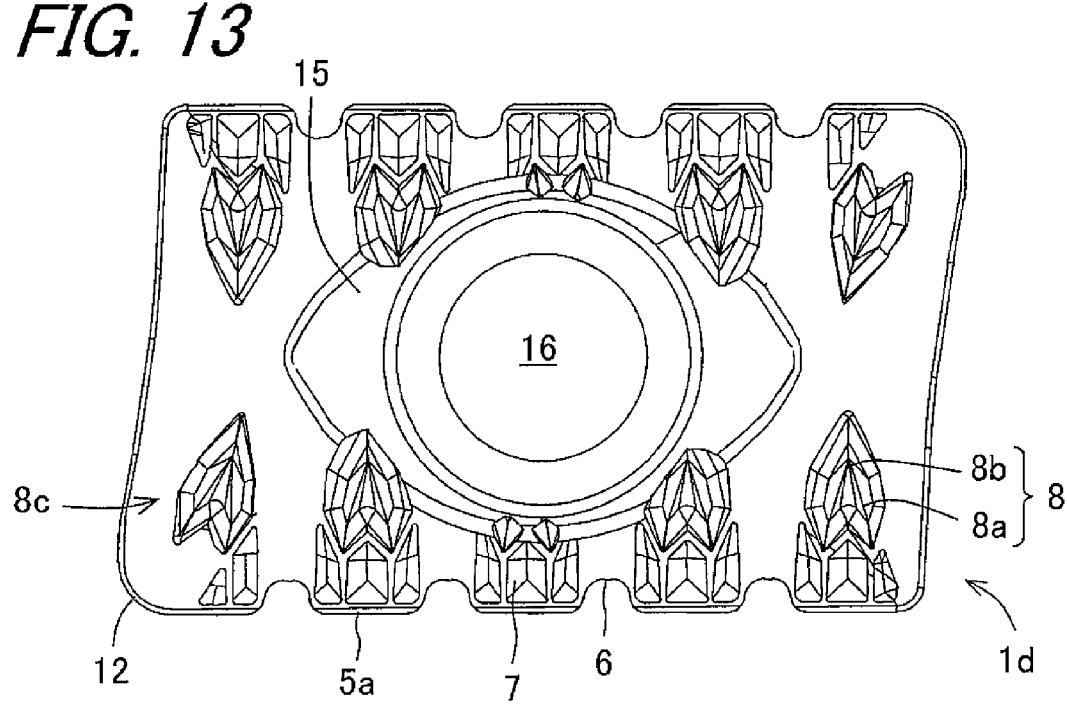
FIG. 13 is a flat view of the cutting insert 1d in accordance with the fifth embodiment.
Figure 14:
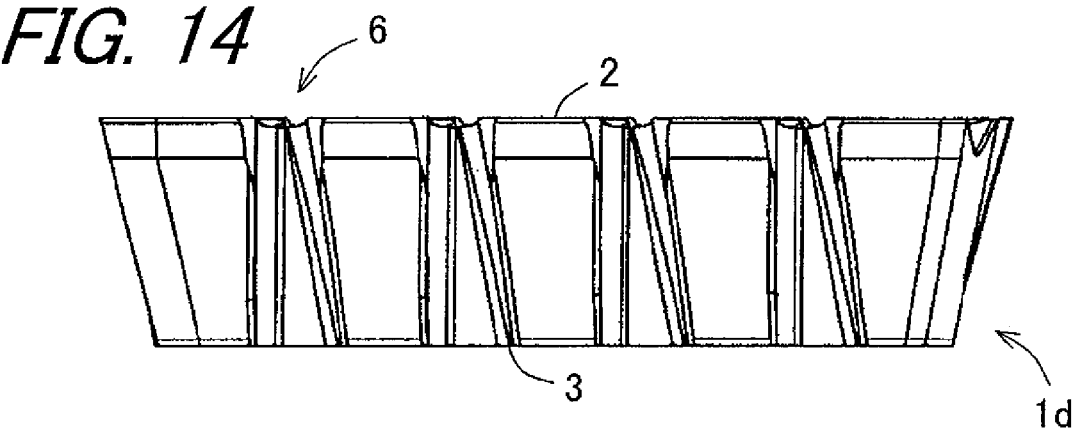
FIG. 14 is a side view of a long side of the cutting insert 1d in accordance with the fifth embodiment.

Now, described will be a fifth embodiment of the invention. FIG. 12 is a perspective view of a cutting insert 1d in accordance with the fifth embodiment. FIG. 13 is a flat view of the cutting insert 1d in accordance with the fifth embodiment. FIG. 14 is a side view of a long side of the cutting insert 1d in accordance with the fifth embodiment. FIG. 15 is a side view of a short side of the cutting insert 1d in accordance with the fifth embodiment. The cutting insert 1d in accordance with the fifth embodiment is particularly similar to the insert 1c in accordance with the fourth embodiment. The cutting insert 1d in accordance with the fifth embodiment is different from the insert 1c in accordance with the fourth embodiment in a structure of the projecting part 8c corresponding to the corner cutting edge 12 (merely referred to as "a corner projecting part" in some cases, hereinafter).

The corner projecting part 8c of the insert 1d in accordance with the fifth embodiment is arranged to have a structure similar to that of the other projecting parts 8. Concretely, the corner projecting part 8c is formed of two first projecting parts 8a and one second projecting part 8b, which are connected and formed integrally. One first projecting part 8a of the two first projecting parts 8a on the outer side of the insert 1d is set so that an angle θ between a ridge line of the first projecting part 8a and the main cutting edge division 5a is in a range of from 60° to 85°, as described above. The other first projecting part 8a of the two first projecting parts 8a on the inner side of the insert 1d is set so that a ridge line thereof crosses at substantially right angles with a direction in which the main cutting edge division 5a connected to the corner cutting edge 12 extends.

Forming the two first projecting parts 8a as described above allows the chips 13 formed by the corner cutting edge 12 to be curled into a small size as well as allowing the chips 13 formed by the main cutting edge division 5a connected to the corner cutting edge 12 to be also curled into a small size. This further improves the chip removing performance.

Figure 16:
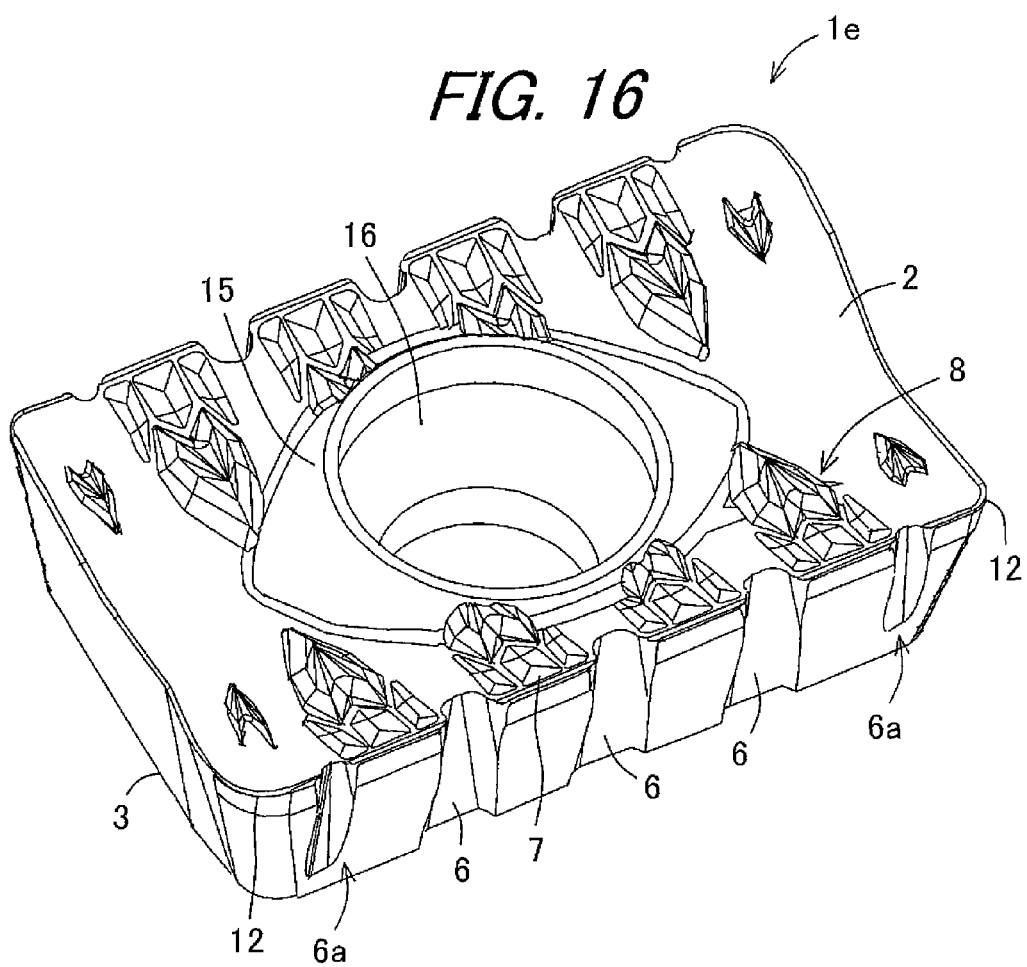
FIG. 16 is a perspective view of a cutting insert 1e in accordance with a sixth embodiment.

Now, described will be a sixth embodiment of the invention. FIG. 16 is a perspective view of a cutting insert 1e in accordance with the sixth embodiment. The cutting insert 1e in accordance with the sixth embodiment is particularly similar to the insert 1d in accordance with the fifth embodiment. The cutting insert 1e in accordance with the sixth embodiment is different from the insert 1d in accordance with the fifth embodiment in the number of the formed groove parts 6.

In the insert 1d in accordance with the sixth embodiment, formed in the flank face 4 are plural (three in the sixth embodiment) groove parts 6, each of which has one end reaching the rake face 2 and the other end reaching the bottom surface 3. In the flank face 4, also formed are plural (two in the sixth embodiment) groove parts 6a, each of which has one end reaching the rake face 2 and the other end not reaching the bottom surface 3. The groove parts 6a not reaching the bottom surface 3 are formed on the both sides in the longitudinal direction. In other words, the groove part 6a not reaching the bottom surface 3 is formed in a part adjacent to the corner cutting edge 12. The main cutting edge 5 is formed of plural (six in the sixth embodiment) main cutting edge divisions 5a divided by the groove parts 6 and 6a. Reducing the main cutting edge divisions 5a in size as described above allows the chips 13 to be made small. Accordingly, the chip removing performance can be improved.

Figure 17:
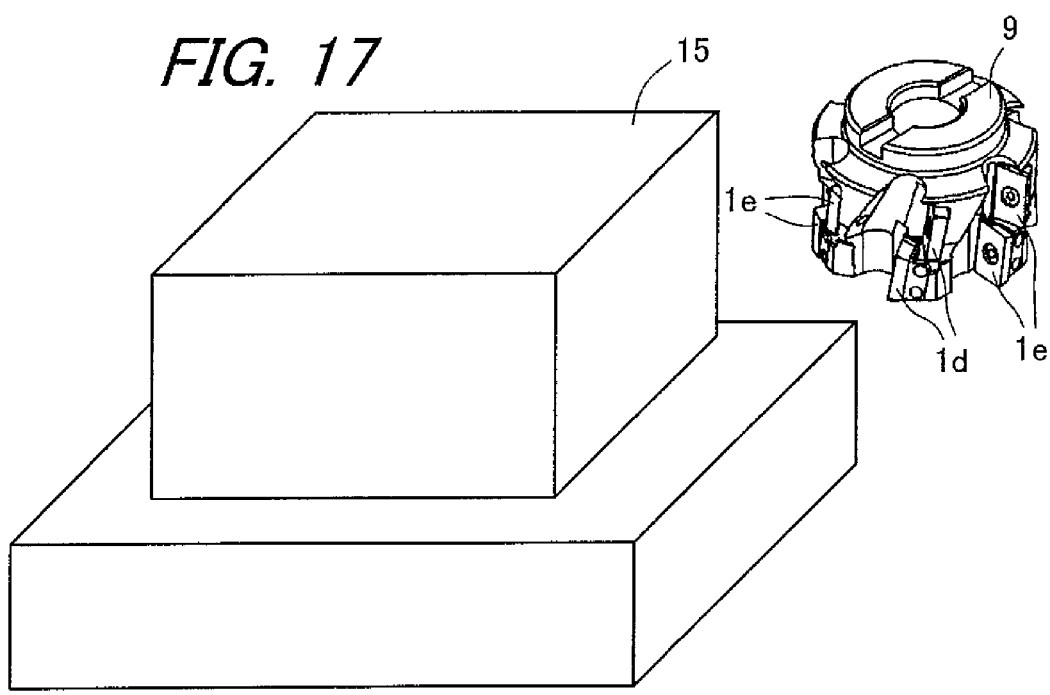
FIG. 17 is a view illustrating a stage of the cutting method, which view is a perspective view showing a preparation stage before cutting of a workpiece 15 starts.
Figure 18:
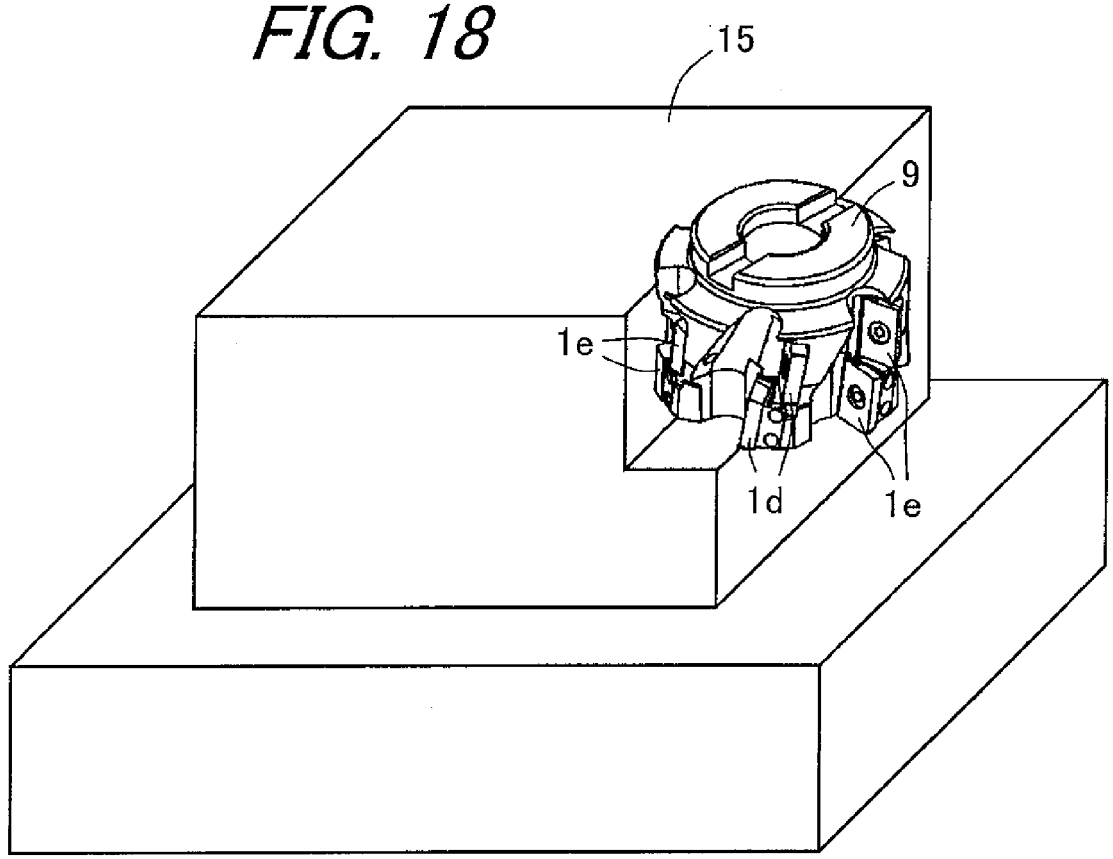
FIG. 18 is a view illustrating a stage of the cutting method, which view is a perspective view showing a stage of cutting the workpiece 15.
Figure 19:
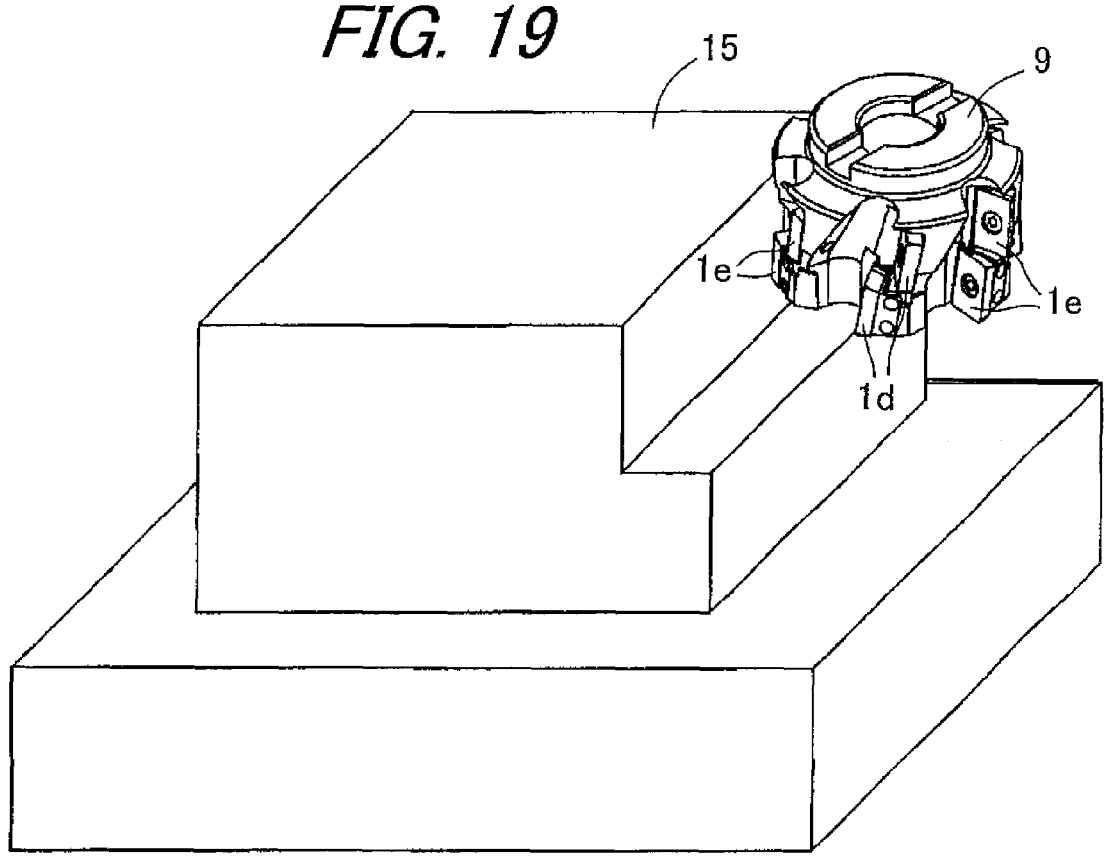
FIG. 19 is a view illustrating a stage of the cutting method, which view is a perspective view showing a stage where cutting of the workpiece 15 is completed.
Figure 20:
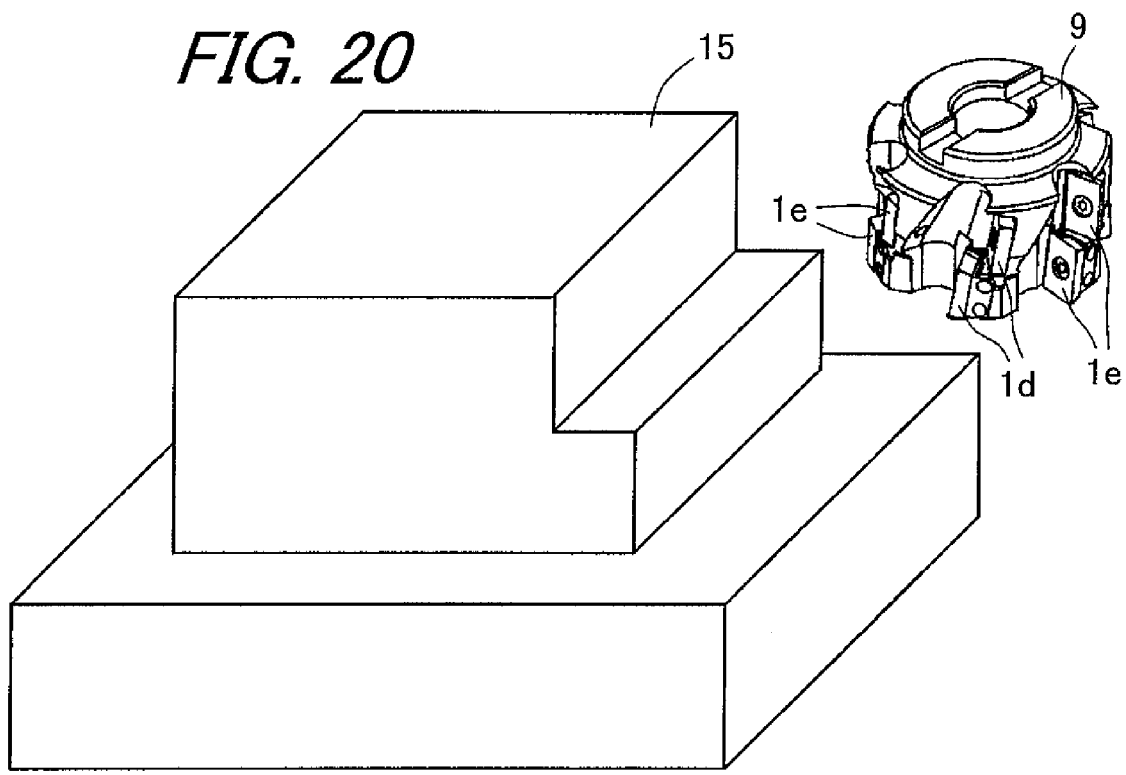
FIG. 20 is a view illustrating a stage of the cutting method, which view is a perspective view showing a stage after the stage where cutting of the workpiece 15 is completed.

Now, described further in detail will be the milling tool 9 to which the insert 1, 1a, 1b, 1c, 1d or 1e in accordance with each of the embodiments (merely referred to as a "insert 1" in some cases, hereinafter) is mounted and a cutting method using the milling tool 9. FIG. 17 is a view illustrating a stage of the cutting method, which view is a perspective view showing a preparation stage before cutting of a workpiece 15 starts. FIG. 18 is a view illustrating a stage of the cutting method, which view is a perspective view showing a stage of cutting the workpiece 15. FIG. 19 is a view illustrating a stage of the cutting method, which view is a perspective view showing a stage where cutting of the workpiece 15 is completed. FIG. 20 is a view illustrating a stage of the cutting method, which view is a perspective view showing a stage after the stage where cutting of the workpiece 15 is completed. FIG. 21 is a flowchart showing a cutting method using the milling tool 9. The cutting method using the milling tool 9 will be described hereinafter along the flowchart shown in FIG. 21. The process goes to Step a1 when the cutting method starts.

Step a1 is a mounting step. In Step a1, the insert 1 is mounted to the holder 10 so that an axial rake of the main cutting edge division 5a is positive, as shown in FIG. 17, and then, the step goes to Step a2. The milling tool 9 is formed in such a mounting step. In the case of the insert 1 having the main cutting edge 5 provided with the groove part 6 like the embodiment, no cutting is carried out in the groove part 6. Accordingly, a belt-shaped part where cutting is left unfinished occurs in a wall surface of the workpiece 15, the wall surface being to be processed, when only a single kind of plural inserts 1 are mounted to the holder. Therefore, the inserts 1d and 1e, which are the inserts described above and which have different arrangement of the groove parts 6 as shown in FIGS. 12 and 16, are alternately provided on the same circumference of the holder 10.

Step a2 is an approaching step in which the milling tool 9 approaches the rectangular parallelepiped workpiece 15, as shown in FIG. 17. The step goes to Step a3. Step a4 is a cutting step in which the milling tool 9 is rotated so that the main cutting edge division 5a is in contact with a surface of the workpiece 15, as shown in FIG. 18, to cut the surface of the workpiece 15. The step goes to Step a4 after the above. Accordingly, the workpiece 15 is processed into a desired shape in Step a3, as shown in FIG. 19. The milling tool 9 is rotated to carry out the cutting step in the embodiment. The invention, however, is not limited to the above. The workpiece 15 may be rotated like a so-called lathe so that the milling tool 9 approaches and contacts with the rotating workpiece 15 to carry out the cutting. Step a4 is a retracting step in which the milling tool 9 is retracted from the workpiece 15, as show in FIG. 20. The flow is thus completed.

As described above, in the cutting method in accordance with the embodiment, the milling tool 9 is mounted to a machine tool (not shown) such as a machining center, the milling tool 9 is rotated to be put on a side surface of the workpiece 15 and the main cutting edge 5 repeatedly cuts the workpiece 15. This allows cutting such as a shouldering to be carried out. In the milling tool 9 in accordance with the embodiment, the inserts 1d and 1e different in arrangement of the groove parts 6 are alternately provided on the same circumference of the holder 10 as described in Step a1. This allows a part where cutting is left unfinished due to the groove part 6 of one insert 1d to be cut by means of the main cutting edge division 5a of the other insert 1e. As a result, the part where cutting is left unfinished due to the groove part 6 is prevented from occurring. Accordingly, suppressed can be a difference in step occurring in the wall surface of the workpiece 15, the wall surface being to be processed, after the cutting. The chips 13, which are formed in a process using the milling tool 9 to which the inserts 1d and 1e different in arrangement of the groove parts 6 are mounted as described above, have a cross section thickest in the vicinity of the center in the width direction. Accordingly, the contact area is smallest in an area where the chips are thickest when the concave part 7 is formed in a center position of each main cutting edge division 5a. This allows an effect of reduction in cutting resistance to be achieved to the maximum.

Further, the chips 13 are reduced in diameter of curl, and thereby, reduced in size in the case of using the cutting method for processing the workpiece 15 by means of the milling tool 9 to which the cutting insert 1 in accordance with the invention is mounted. Accordingly, the chips 13 are smoothly removed from the chip pocket 11 to the outside. This allows a problem such as a fracture of the main cutting edge due to the chips 13 stuffed in the cutting edge to be suppressed. The above case is thus effective.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

INDUSTRIAL APPLICABILITY

In accordance with the invention, a concave part, which is depressed in a rake face, is formed in the vicinity corresponding to each of the main cutting edge divisions. Forming such a concave part allows a contact ratio of the chips passing on the rake face, the chips being formed by plural main cutting edge divisions divided by a groove part, to the rake face to be reduced. Accordingly, the cutting resistance can be reduced. Forming such a concave part causes no change in cutting edge arrangement of the main cutting edge. This allows chatter vibration in a cutting or the like to be suppressed with the cutting edge arrangement of the main cutting edge being maintained, in other words, without lowering the strength of the cutting edges.

Further, in accordance with the invention, the concave part is formed in an area between the adjacent groove parts. Accordingly, a probability that the chips formed by the main cutting edge division between the adjacent groove parts pass above the concave part can be increased. This allows the concave part to be formed only in a necessary place, so that deterioration in strength of the cutting edge due to the concave part can be reduced as much as possible, and thereby, the chatter vibration can be suppressed.

Moreover, in accordance with the invention, the concave part is formed in a direction substantially vertical to each of the main cutting edge divisions. Accordingly, the concave part is formed so as to extend along a direction in which the chips formed by the respective main cutting edge divisions advance. This allows the contact ratio between the chips passing on the rake face and the rake face to be effectively reduced. As a result, the cutting resistance can be effectively reduced.

Furthermore, in accordance with the invention, the concave part is formed in plural numbers for each of the main cutting edge divisions. This allows the contact ratio between the chips passing on the rake face and the rake face to be reduced, and thereby, the cutting resistance can be effectively reduced. Moreover, the rake face exists between the adjacent concave parts formed in a rake face area in the vicinity of the respective main cutting edge divisions. Accordingly, the rake face allows the strength of the cutting insert to be maintained.

In addition, in accordance with the invention, at least one projecting part is formed in an area facing the main cutting edge division in the rake face. Accordingly, the chips formed by the main cutting edge division can be made collide with the projecting part formed in the rake face. This allows the projecting part to contribute to curl of the chips, so that the chip removing performance can be improved. Further, the curl of the chips allows the chips to be prevented from contacting with a chip pocket wall surface of a holder main body to which the cutting insert is mounted. This allows the holder to be used for a long period of time without wearing the holder wall surface 10a of the chip pocket 11 due to the chips. Accordingly, a cutting insert high in cost performance can be achieved.

Moreover, in accordance with the invention, the concave part is provided so as to extend between the projecting part and the main cutting edge division. This allows both of an effect of reducing the cutting resistance, the effect being achieved when the chips pass above the concave part, and a chip removal effect achieved by collision of the chips with the projecting part after the chips passed above the concave part to be managed.

Further, in accordance with the invention, the facing surface is formed so as to gradually rise from the rake face as it goes away from the facing main cutting edge division. Accordingly, the chips colliding the facing surface can be smoothly guided along the facing surface. This allows the chips to be prevented from damaging the projecting part, and thereby, the performance of removing chips to be improved.

Furthermore, in accordance with the invention, the facing surface is formed so as to gradually rise from the rake face as it goes away from the facing main cutting edge division. Accordingly, the chips colliding the facing surface can be curled and smoothly guided along the facing surface. This allows the chips to be prevented from damaging the projecting part, and thereby, the performance of removing chips to be improved.

Additionally, in accordance with the invention, the facing surface is a curved concave surface. This allows the chips colliding the facing surface to be certainly curled and smoothly guided.

Moreover, in accordance with the invention, the facing surface includes plural flat surfaces different in rising angle. Accordingly, the probability of contact of the chips with the facing surface for plural times can be increased. This allows the chip removing performance to be improved.

Further, in accordance with the invention, the facing surface is formed so that the main-cutting-edge-side end of the facing surface is narrowest. The chips first collide with the facing surface at the main-cutting-edge-side end. A part with which the chips first collide receives greatest stress from the chips. Accordingly, most reducing the part in width as described above can increase the pressure operating on the chips. This allows a direction of removing the chips to be guided along the facing surface. Moreover, the facing surface has a part where the width increases as the facing surface goes away from the corresponding main cutting edge division. This means that the strength of the facing surface increases as the facing surface goes away from the main cutting edge division. This allows the chips to be prevented from damaging the facing surface, so that the facing surface allowing the chip removing performance to be improved can be achieved.

In addition, in accordance with the invention, providing plural projecting parts for the corresponding main cutting edge division allows the possibility of collision of the chips with the projecting parts to be increased. This allows the projecting parts to contribute to improvement in chip removing performance. Moreover, the plural projecting parts lie in a row at a position away from the facing main cutting edge division more than the facing surface. Lying in a row at a position away from the facing main cutting edge division allows the strength of the projecting parts to be improved more than the case that the respective projecting parts are independently provided. Accordingly, damage by the chips can be prevented even in the case of providing plural projecting parts.

Furthermore, in accordance with the invention, a screw hole passing through to a lower surface is formed at a substantial center of the rake face. Accordingly, screwing a screw member in the screw hole as well as screwing a screw member on a holder main body to which the cutting insert is mounted allows the cutting insert to be certainly fixed to the holder main body. Moreover, providing the protrusion part on the periphery of the screw hole allows a head part of a screw member to be covered with the protrusion part with the screw member screwed in the screw hole. This can prevent the head part of the screw member from being damaged due to collision of the chips. In addition, continuously providing the projecting part and the protrusion part allows the strength of the projecting part to be improved more than the case of providing the projecting part independently.

Moreover, in accordance with the invention, the concave part depressed in the rake face is formed in the vicinity corresponding to each of the main cutting edge divisions. Forming such a concave part can reduce the contact ratio between the chips and the rake face when the chips formed by the plural main cutting edge divisions divided by the groove part pass on the rake face. This allows the cutting resistance to be reduced. Forming such a concave part causes no necessity of a change in cutting edge arrangement of the main cutting edge. Accordingly, chatter vibration in the cutting or the like can be suppressed with the cutting edge arrangement of the main cutting edge being maintained, in other words, without lowering the strength of the cutting edge.

Further, at least one projecting part is formed in the vicinity and the projecting part includes a first projecting part and a second projecting part. The first projecting part is formed closely to the main cutting edge division side more than the second projecting part. Accordingly, the chips formed by the main cutting edge division first collide with the first projecting part. This allows the chips to be removed along the first projecting part. Further, the second projecting part is higher than the first projecting part, so that the chips having collided with the first projecting part can be made further collide with the second projecting part. This allows the removing direction of the chips to be fixed by the second projecting part. Accordingly, the chip pocket wall surface of the holder main body to which the cutting insert is mounted can be prevented from being in contact with the chips. This allows the holder to be used for a long period of time without wearing the holder wall surface 10a of the chip pocket 11 due to the chips. This results in achievement of a cutting insert excellent in cost performance.

Additionally, in accordance with the invention, the projecting part includes plural first projecting parts, so that the possibility of collision of the chips with the projecting part can be increased. Accordingly, the projecting part can contribute to improvement in performance of removing chips. Further, the plural first projecting parts are provided integrally with one second projecting part. Providing thus the plural first projecting parts integrally with the second projecting part allows the strength of the projecting part to be improved more than the case of separately providing plural projecting parts, which are formed of one first projecting part and one second projecting part so that the first projecting part is configured integrally with the second projecting part, and allows the plural first projecting parts to be provided. Accordingly, the chips can be prevented from giving damage even in the case that the first projecting part is provided into plural numbers.

Furthermore, in accordance with the invention, the first projecting part is in the shape tapering off as the first projecting part approaches the main cutting edge division. The chips first collide with the facing surface on the main cutting edge division side. The part where the chips first collide receives greatest stress from the chips. Accordingly, forming the part into the shape tapering off as described above to be narrowest can cause the pressure on the chips to be increased. This allows the direction of removing the chips to be guided along the facing surface. Furthermore, the strength of the first projecting part increases as the first projecting part goes away from the main cutting edge division since there is a part gradually widened as the part goes away from the corresponding main cutting edge division. This allows the chips to be prevented from damaging the first projecting part, so that the chip removing performance can be improved.

Moreover, in accordance with the invention, the facing surface is formed so as to gradually rise from the rake face as the facing surface goes away from the facing main cutting edge division. This allows the chips colliding with the facing surface to be smoothly guided along the facing surface. Accordingly, the chips can be prevented from damaging the first projecting part, so that the chip removing performance can be improved.

In addition, in accordance with the invention, the facing surface is formed so as to have the rising angle gradually increasing as the facing surface goes away from the facing main cutting edge division. This allows the chips colliding with the facing surface to be curled and guided smoothly along the facing surface. Accordingly, the chips can be prevented from damaging the projecting part, so that the chip removing performance can be improved.

Further, in accordance with the invention, the facing surface is a curved concave surface. This allows the chips colliding with the facing surface to be certainly curled and smoothly guided.

Moreover, in accordance with the invention, the facing surface includes plural flat surfaces different in rising angle. Accordingly, the probability of contact of the chips with the facing surface for plural times can be increased. This allows the chip removing performance to be improved.

Furthermore, in accordance with the invention, the chip guide surface is formed so as to gradually rise from the rake face as the chip guide surface goes away from the facing main cutting edge division. Accordingly, the chips guided from the facing surface of the first projecting part can be smoothly guided along the chip guide surface of the second projecting part. This allows the chips to be prevented from damaging the second projecting part, so that the chip removing performance can be further improved.

In addition, in accordance with the invention, the chip guide surface suppresses an advance of the chips in a direction opposite to the facing main cutting edge division. Accordingly, the chips can be certainly prevented from being in contact with the chip pocket wall surface of the holder main body to which the cutting insert is mounted.

Further, in accordance with the invention, a screw hole passing through to a lower surface is formed at the substantial center of the rake face. Accordingly, screwing a screw member in the screw hole as well as screwing a screw member also on a holder main body to which the cutting insert is mounted allows the cutting insert to be certainly fixed to the holder main body. Moreover, providing the protrusion part on the periphery of the screw hole allows a head part of a screw member to be covered with the protrusion part with the screw member screwed in the screw hole. This can prevent the head part of the screw member from being damaged due to collision of the chips. In addition, continuously providing the second projecting part and the protrusion part allows the strength of the second projecting part to be improved more than the case of providing the second projecting part independently. Accordingly, the strength of the projecting part can be improved.

Furthermore, in accordance with the invention, the cutting insert provided with a main cutting edge division and at least a concave part in the rake face adjacent to the main cutting edge division is mounted to the holder for a milling tool. This allows the cutting resistance, which occurs in a chip forming stage, to be reduced. Accordingly, occurrence of chatter vibration and the like can be suppressed even in the cutting in which a depth of cut is large and the like.

Moreover, in accordance with the invention, the cutting insert is mounted to the holder so that an axial rake of the main cutting edge division is positive. Accordingly, the cutting resistance, which occurs when each of the main cutting edge divisions bites a workpiece to be cut, can be reduced in cutting. This allows occurrence of chatter vibration or the like to be further suppressed.

Additionally, in accordance with the invention, the milling tool is used for cutting a surface of a workpiece to be cut. Accordingly, the cutting resistance, which occurs in a stage of forming chips, can be reduced. This allows occurrence of chatter vibration and the like to be suppressed even in the cutting in which a depth of cut is large and the like, so that a condition of a processed surface of the workpiece can be excellently finished, as a result. Moreover, suppression of chatter vibration of the milling tool per se causes reduction in shock (minute vibration) given to a cutting edge, and thereby, the life of the tool can be also prolonged.

In addition, in accordance with the invention, the cutting insert is mounted to the holder for a milling tool to form the milling tool with which the workpiece is cut. Accordingly, the cutting resistance, which occurs in a stage of forming chips, can be reduced. This allows occurrence of chatter vibration and the like to be suppressed even in the cutting in which a depth of cut is large and the like, so that a condition of a processed surface of the workpiece can be excellently finished, as a result. Moreover, suppression of chatter vibration of the milling tool per se causes reduction in shock (minute vibration) given to a cutting edge, and thereby, the life of the tool can be also prolonged.

The invention claimed is:

1. A cutting insert comprising:
a main body part comprising an upper surface provided with a rake face and a side surface provided with a flank face;
a main cutting edge formed in an intersecting ridge line part of the rake face and the flank face; and
a groove part formed in the flank face and having an end reaching the rake face,
wherein the main cutting edge comprises a plurality of main cutting edge divisions divided by the groove part,
wherein the rake face is inclined so that it is closer to a bottom surface of the main body part as a distance from the main cutting edge increases, and
wherein a concave part depressed in the rake face is formed in a vicinity corresponding to each of the main cutting edge divisions in the rake face.

2. The cutting insert of claim 1, wherein the groove part is formed into plural numbers in the flank face, and
the concave part is formed in an area between the adjacent groove parts.

3. The cutting insert of claim 1, wherein the concave part extends in a direction substantially vertical to each of the main cutting edge divisions.

4. The cutting insert of claim 1, wherein the concave part is formed into plural numbers for each of the main cutting edge divisions.

5. The cutting insert of claim 1, wherein at least one projecting part is formed in an area corresponding to the main cutting edge division in the rake face.

6. The cutting insert of claim 5, wherein the concave part extends between the at least one projecting part and the main cutting edge division.

7. The cutting insert of claim 5, wherein the at least one projecting part comprises a facing surface facing the corresponding main cutting edge division, and
the facing surface gradually rises from the rake face as the facing surface goes away from the facing main cutting edge division.

8. The cutting insert of claim 5, wherein the at least one projecting part comprises a facing surface facing the corresponding main cutting edge division, and
the facing surface has a rising angle to the rake face, the rising angle gradually increasing as the facing surface goes away from the facing main cutting edge division.

9. The cutting insert of claim 8, wherein the facing surface is a curved concave surface.

10. The cutting insert of claim 8, wherein the facing surface includes plural flat surfaces different in rising angle to the rake face.

11. The cutting insert of claim 7 or 8, wherein a main-cutting-edge-side end of the facing surface of the projecting part is located most closely to the corresponding main cutting edge division, and
the at least one projecting part has a part narrowest at the main-cutting-edge-side end of the facing surface and increasing in width as the part goes away from the corresponding main cutting edge division.

12. The cutting insert of claim 7 or 8, wherein the at least one projecting part is provided into plural numbers for the facing main cutting edge division and the plural projecting parts are continued at a position away from a facing main cutting edge division side more than the facing surface.

13. The cutting insert of claim 5, wherein a screw hole passing through to a lower surface is formed at a substantial center of the rake face,
a protrusion part is provided on a periphery of the screw hole, and
the projecting part and the protrusion part are continued from each other.

14. A cutting insert comprising:
a main body part comprising an upper surface provided with a rake face and a side surface provided with a flank face;
a main cutting edge formed in an intersecting ridge line part of the rake face and the flank face; and
a groove part formed in the flank face and having an end reaching the rake face, wherein the main cutting edge comprises a plurality of main cutting edge divisions divided by the groove part, the rake face is inclined so that it is closer to a bottom surface of the main body part as a distance from the main cutting edge increases, a concave part depressed in the rake face and at least one projecting part are formed in a vicinity corresponding to each of the main cutting edge divisions in the rake face, the at least one projecting part comprising a first projecting part and a second projecting part, the second projecting part being formed on a side opposite to the corresponding main cutting edge division with respect to the first projecting part, the second projecting part being higher than the first projecting part.

15. The cutting insert of claim 14, wherein the at least one projecting part comprises:

one second projecting part; and plural first projecting parts provided integrally with the one second projecting part.

16. The cutting insert of claim 14, wherein the first projecting part is in the shape of a taper gradually decreasing in width and height as the first projecting part approaches the facing main cutting edge division.

17. The cutting insert of claim 14, wherein the main cutting edge side of the first projecting part has a facing surface facing the corresponding main cutting edge division, and the facing, surface gradually rises from the rake face as the facing surface goes away from the facing main cutting edge division.

18. The cutting insert of claim 14, wherein the main cutting edge side of the first projecting part has a facing surface facing the corresponding main cutting edge division, and the facing surface has a rising angle to the rake face, the rising angle gradually increasing as the facing surface goes away from the facing main cutting edge division.

19. The cutting insert of claim 18, wherein the facing surface is a curved concave surface.

20. The cutting insert of claim 18, wherein the facing surface includes plural surfaces different in rising angle to the rake face.

21. The cutting insert of claim 14, wherein the main cutting side of the second projecting part has a chip guide surface facing the corresponding main cutting edge division, and the chip guide surface gradually rises from the rake face as the chip guide surface goes away from the facing main cutting edge division.

22. The cutting insert of claim 14, wherein the second projecting part has a chip guide surface for suppressing an advance of chips in a direction opposite to the facing main cutting edge division.

23. The cutting insert of claim 14, wherein a screw hole passing through to a lower surface is formed at a substantial center of the rake face, a protrusion part is provided on a periphery of the screw hole, and the second projecting part and the protrusion part are continued from each other.

24. The cutting insert of claim 21 or 22, wherein the second projecting part is a protrusion part.

25. A milling tool comprising:

the cutting insert of claim 1 or 14; and a holder for a milling tool capable of detaching the plural one or more of the cutting inserts at outer circumferential positions.

26. The milling tool of claim 25, wherein the cutting insert is mounted to the holder for a milling tool so that an axial rake of the main cutting edge division is positive.

27. A cutting method of cutting a workpiece by means of the milling tool of claim 25, comprising:

a cutting step for rotating at least one of the milling tool and the workpiece and cutting a surface of the workpiece by contact of the main cutting edge division with the surface of the workpiece; and a retracting step for retracting the main cutting edge division from the workpiece.

28. A cutting method of cutting a workpiece by means of the cutting insert of claim 1 or 14, comprising:

a mounting step for mounting the cutting insert to a holder for a milling tool to form the milling tool, the holder being capable of mounting and demounting a plurality of cutting inserts at outer circumferential positions thereof;

a cutting step for rotating at least one of the milling tool and the workpiece and cutting a surface of the workpiece by contact of the main cutting edge division with the surface of the workpiece; and a retracting step for retracting the main cutting edge division from the workpiece.

29. The cutting insert of claim 1, wherein the concave part is separated from the plurality of main cutting edge divisions.

30. The cutting insert of claim 1, wherein the concave part extends only within a region corresponding to the main cutting edge division in a direction of the main cutting edge.

31. The cutting insert of claim 14, wherein the concave part is separated from the plurality of main cutting edge divisions.

32. The cutting insert of claim 14, wherein the concave part extends only within a region corresponding to the main cutting edge division in a direction of the main cutting edge.

* * * * *